(12) United States Patent
Cho

(10) Patent No.: US 12,232,547 B2
(45) Date of Patent: Feb. 25, 2025

(54) TRACKING AND ALERT METHOD AND SYSTEM FOR WORKER PRODUCTIVITY AND SAFETY

(71) Applicant: GEORGIA TECH RESEARCH CORPORATION, Atlanta, GA (US)

(72) Inventor: Yong Cho, Atlanta, GA (US)

(73) Assignee: Georgia Tech Research Corporation, Atlanta, GA (US)

(*) Notice: Subject to any disclaimer, the term of this patent is extended or adjusted under 35 U.S.C. 154(b) by 593 days.

(21) Appl. No.: 17/440,250

(22) PCT Filed: Mar. 18, 2020

(86) PCT No.: PCT/US2020/023270
§ 371 (c)(1),
(2) Date: Sep. 17, 2021

(87) PCT Pub. No.: WO2020/191004
PCT Pub. Date: Sep. 24, 2020

(65) Prior Publication Data
US 2022/0172594 A1 Jun. 2, 2022

Related U.S. Application Data

(60) Provisional application No. 62/820,047, filed on Mar. 18, 2019, provisional application No. 62/820,040, filed on Mar. 18, 2019.

(51) Int. Cl.
*A41D 1/00* (2018.01)
*B60Q 1/50* (2006.01)
(Continued)

(52) U.S. Cl.
CPC ............. *A41D 1/002* (2013.01); *B60Q 1/525* (2013.01); *F16P 3/147* (2013.01); *G01S 11/06* (2013.01);
(Continued)

(58) Field of Classification Search
CPC ... A41D 1/002; G06Q 10/06398; F16P 3/147; G01S 11/06; B60Q 1/525; G06N 3/044; G08B 21/0446
See application file for complete search history.

(56) References Cited

U.S. PATENT DOCUMENTS

2004/0031083 A1 2/2004 Copp
2010/0289662 A1 11/2010 Dasilva et al.
(Continued)

OTHER PUBLICATIONS

DIGI, Emerging Requirement for Next generation SOMs and SBC (Year: 2016).*
(Continued)

*Primary Examiner* — Mohamed Charioui
*Assistant Examiner* — Dacthang P Ngo
(74) *Attorney, Agent, or Firm* — Meunier Carlin & Curfman LLC

(57) ABSTRACT

An exemplary method and system is disclosed that facilitates the monitoring of worker's productivity and safety, for example, at a construction site and other like labor-intensive occupation and settings. The exemplary method and system provides wearable-based motion sensing and/or proximity sensing between worker and construction equipment. A study discussed herein suggests that sensing at two or more torso locations can provide 95% accuracy in classifying worker's action or motion at a construction site. In some embodiments, as discussed herein, the acquired sensed data are transmitted, over a mesh network, e.g., established between the wearable devices, to a cloud infrastructure to facilitate the real-time monitoring of action and actions that such sites.

19 Claims, 20 Drawing Sheets

(51) Int. Cl.
*F16P 3/14* (2006.01)
*G01S 11/06* (2006.01)
*G06N 3/044* (2023.01)
*G06Q 10/0639* (2023.01)
*G08B 7/06* (2006.01)
*G08B 21/04* (2006.01)

(52) U.S. Cl.
CPC ....... *G06N 3/044* (2023.01); *G06Q 10/06398* (2013.01); *G08B 7/06* (2013.01); *G08B 21/0446* (2013.01)

(56) References Cited

U.S. PATENT DOCUMENTS

| | | | |
|---|---|---|---|
| 2011/0227748 | A1 | 9/2011 | Schaible et al. |
| 2012/0293382 | A1 | 11/2012 | Matthews et al. |
| 2014/0070957 | A1 | 3/2014 | Longinotti-Buitoni et al. |
| 2014/0228649 | A1* | 8/2014 | Rayner ................ A61B 5/0002 600/595 |
| 2015/0091716 | A1 | 4/2015 | Hathaway et al. |
| 2016/0091965 | A1* | 3/2016 | Wang .................... G06F 3/0346 345/156 |
| 2016/0301581 | A1* | 10/2016 | Carter ................... H04L 43/024 |
| 2019/0339766 | A1* | 11/2019 | Erivantcev ............ G06F 3/0346 |
| 2020/0174517 | A1* | 6/2020 | Martinez ................ G16H 80/00 |
| 2020/0258365 | A1* | 8/2020 | Ten Kate ........... G08B 21/0446 |

OTHER PUBLICATIONS

International Search Report and Written Opinion dated Jul. 28, 2020, from International Application No. PCT/US2020/023270, 12 pages.
Goodrum, P. M., McLaren, M. A., and Durfee, A. (2006). "The application of active radio frequency identification technology for tool tracking on construction job sites." Automation in Construction, 15(3), 292-302.
Lazaro, A., Girbau, D., and Salinas, D. (2009). "Radio Link Budgets for UHF RFID on Multipath Environments." IEEE Transactions on Antennas and Propagation, 57(4), 1241-1251.
Park, J., Marks, E., Cho, Y., and Suryanto, W. (2015b). "Performance Test of Wireless Technologies for Personnel and Equipment Proximity Sensing in Work Zones." ASCE Journal of Construction Engineering and Management.
Ruff, T. (2007). Recommendations for evaluating and implementing proximity warning system on surface mining equipment.
Marks, E. (2014). "Active Safety Leading Indicators for Human-Equipment Interaction on Construction Sites." Doctoral Dissertation, Georgia Institute of Technology.
CPWR—The Center for Construction Research and Training, The Construction Chart Book: The U.S. Construction Industry and Its Workers, 6th ed., 2018. (Jul. 17, 2019).
The National Institute for Occupational Safety and Health (NIOSH) Ergonomics and Musculoskeletal Disorders, Workplace Safety & Health (Jul. 18, 2019).
McKinsey & Company, The Construction Productivity Imperative, McKinsey & Company, 2015 (Jan. 22, 2018).
P.R. Ghate, A.B. More, P.R. Minde, "Importance of measurement of labour productivity in construction" (Jul. 2019).
McKinsey Global Institute "Reinventing construction: a route to higher productivity" (Feb. 2020).
L. Sveikauskas, S. Rowe, J. Mildenberger, J. Price, A. Young, "Measuring productivity growth in construction," Monthly Labor Review (2018).
L. Pei, R. Guinness, J. Kaistinen, "Cognitive phone for sensing human behavior," IGI Global, Hershey, PA, USA, 2015, pp. 1138-1150.
S. Han, S.M. Asce, S. Lee, A.M. Asce, F. Peña-Mora, M. Asce, "Vision-based detection of unsafe actions of a construction worker: case study of ladder climbing," J. Comput. Civ. Eng. 27 (2013) 635-644.
J. Yang, Z. Shi, Z. Wu, "Vision-based action recognition of construction workers using dense trajectories," Adv. Eng. Inform. 30 (2016) 327-336.
L. Ding, W. Fang, H. Luo, P.E.D. Love, B. Zhong, X. Ouyang, "A deep hybrid learning model to detect unsafe behavior: integrating convolution neural networks and long short-term memory," Autom. Constr. 86 (2018) 118-124.
K. Kim, H. Kim, H. Kim, "Image-based construction hazard avoidance system using augmented reality in wearable device," Autom. Constr. 83 (2017) 390-403.
H. Guo, Y. Yu, Q. Ding, M. Skitmore, "Image-and-skeleton-based parameterized approach to real-time identification of construction workers' unsafe behaviors," J. Constr. Eng. Manag. 144 (2018).
H. Zhang, X. Yan, H. Li, "Ergonomic posture recognition using 3D view-invariant features from single ordinary camera," Autom. Constr. 94 (2018) 1-10.
J.A. Hess, L. Kincl, T. Amasay, P. Wolfe, "Ergonomic evaluation of masons laying concrete masonry units and autoclaved aerated concrete," Appl. Ergon. 41 (2010) 477-483.
H. Luo, C. Xiong, W. Fang, P.E.D. Love, B. Zhang, X. Ouyang, "Convolutional neural networks: computer vision-based workforce activity assessment in construction," Autom. Constr. 94 (2018) 282-289.
V. Escorcia, M.A. Dávila, M. Golparvar-Fard, J.C. Niebles, "Automated vision-based recognition of construction worker actions for building interior construction operations using RGBD cameras," Construction Research Congress 2012, American Society of Civil Engineers, Reston, VA, 2012, pp. 879-888.
Y. Yu, H. Guo, Q. Ding, H. Li, M. Skitmore, "An experimental study of real-time identification of construction workers' unsafe behaviors," Autom. Constr. 82 (2017) 193-206.
S. Han, S. Lee, "A vision-based motion capture and recognition framework for behavior-based safety management," Autom. Constr. 35 (2013) 131-141.
A. Golabchi, S. Han, S. AbouRizk, "A simulation and visualization-based framework of labor efficiency and safety analysis for prevention through design and planning," Autom. Constr. 96 (2018) 310-323.
J. Chen, J. Qiu, C. Ahn, "Construction worker's awkward posture recognition through supervised motion tensor decomposition," Autom. Constr. 77 (2017) 67-81.
R. Akhavian, A.H. Behzadan, "Smartphone-based construction workers' activity recognition and classification," Autom. Constr. 71 (2016) 198-209.
N.D. Nath, A.H. Behzadan, "Construction productivity and ergonomic assessment using mobile sensors and machine learning," Computing in Civil Engineering, 2017, American Society of Civil Engineers, Reston, VA, 2017, pp. 434-441.
R. Akhavian, A.H. Behzadan, "Productivity analysis of construction worker activities using smartphone sensors," Proceedings of 16th International Conference on Computing in Civil and Building Engineering, 2016, pp. 1067-1074.
M.F. Antwi-Afari, H. Li, J. Seo, A.Y.L. Wong, "Automated detection and classification of construction workers' loss of balance events using wearable insole pressure sensors," Autom. Constr. 96 (2018) 189-199.
S. Xing, H. Tong, P. Ji, "Activity recognition with smartphone sensors," Tsinghua Sci. Technol. 19 (2014) 235-249.
J. Ryu, J. Seo, M. Liu, S. Lee, C.T. Haas, "Action recognition using a wristband-type activity tracker: case study of masonry work," Construction Research Congress, 2016, 2016, pp. 790-799.
K. Yang, C.R. Ahn, "Inferring workplace safety hazards from the spatial patterns of workers' wearable data," Adv. Eng. Inform. 41 (2019).
J. Ryu, J. Seo, H. Jebelli, S. Lee, "Automated action recognition using an accelerometer-embedded wristband-type activity tracker," J. Constr. Eng. Manag. 145 (2019) 1-14.
K. Yang, C.R. Ahn, M.C. Vuran, S.S. Aria, "Semi-supervised near-miss fall detection for ironworkers with a wearable inertial measurement unit," Autom. Constr. 68 (2016) 194-202.
A. Alwasel, A. Sabet, M. Nahangi, C.T. Haas, E. Abdel-Rahman, "Identifying poses of safe and productive masons using machine learning," Autom. Constr. 84 (2017) 345-355.

(56) References Cited

OTHER PUBLICATIONS

J. Zhao, E. Obonyo, "Convolutional long short-term memory model for recognizing postures from wearable sensor," CEUR Workshop Proceedings, 2019.

E. Valero, A. Sivanathan, F. Bosché, M. Abdel-Wahab, "Analysis of construction trade worker body motions using a wearable and wireless motion sensor network," Autom. Constr. 83 (2017) 48-55.

K. Yang, C.R. Ahn, H. Kim, "Validating ambulatory gait assessment technique for hazard sensing in construction environments," Autom. Constr. 98 (2019) 302-309.

H. Jebelli, C.R. Ahn, T.L. Stentz, "Fall risk analysis of construction workers using inertial measurement units: validating the usefulness of the postural stability metrics in construction," Saf. Sci. 84 (2016) 161-170.

H. Jebelli, S.M. Asce, Changbum, R. Ahn, A.M. Asce, T.L. Stentz, "Comprehensive fall-risk assessment of construction workers using inertial measurement units: validation of the gait-stability metric to assess the fall risk of Iron workers," J. Comput. Civ. Eng. 30 (2015).

X. Yan, H. Li, A.R. Li, H. Zhang, "Wearable IMU-based real-time motion warning system for construction workers' musculoskeletal disorders prevention," Autom. Constr. 74 (2017) 2-11.

A. Singh, N. Thakur, A. Sharma, "A review of supervised machine learning algorithms," Proceedings of the 10th INDIACom, 2016 3rd International Conference on Computing for Sustainable Global Development, INDIACom 2016, 2016, pp. 1310-1315.

S. Dreiseitl, L. Ohno-Machado, "Logistic regression and artificial neural network classification models: a methodology review," J. Biomed. Inform. 35 (2002) 352-359.

S.-R. Ke, H. Thuc, Y.-J. Lee, J.-N. Hwang, J.-H. Yoo, K.-H. Choi, "A review on video-based human activity recognition," Computers 2 (2013) 88-131.

F. Attal, S. Mohammed, M. Dedabrishvili, F. Chamroukhi, L. Oukhellou, Y. Amirat, "Physical human activity recognition using wearable sensors," Sensors 15 (2015) 31314-31338.

F. Ordóñez, D. Roggen, "Deep convolutional and LSTM recurrent neural networks for multimodal wearable activity recognition," Sensors 16 (2016) 115.

Y. Zhao, R. Yang, G. Chevalier, M. Gong, "Deep residual Bidir-LSTM for human activity recognition using wearable sensors," Math. Probl. Eng. 2018 (2018) 13.

D.P. Kingma, J. Lei Ba, "ADAM: a method for stochastic optimization," The 3rd International Conference for Learning Representations, San Diego, 2015.

K. Boyd, K.H. Eng, C.D. Page, "Area Under the Precision-recall Curve: Point Estimates and Confidence Intervals," Springer, Berlin, Heidelberg, 2013.

\* cited by examiner

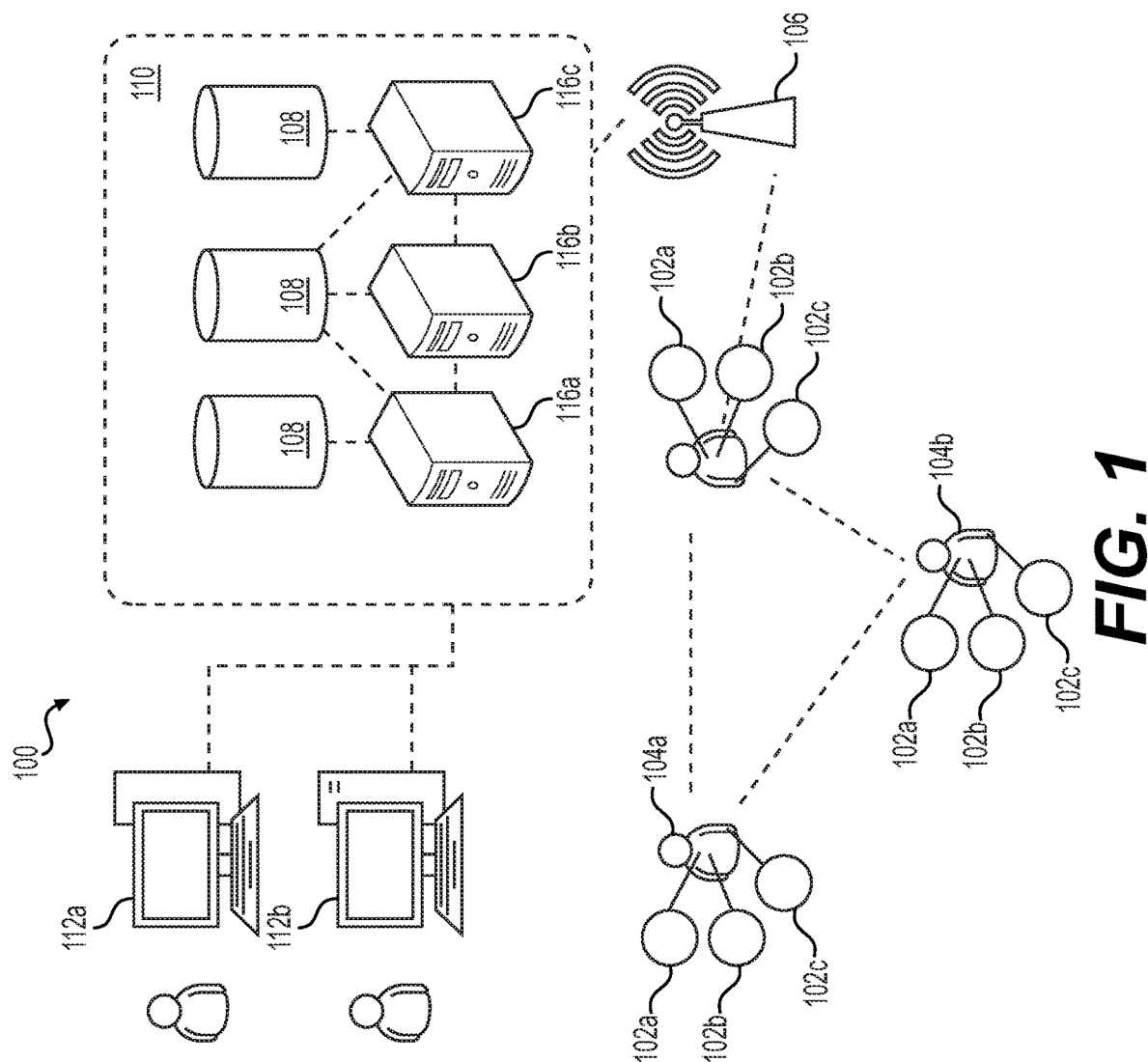

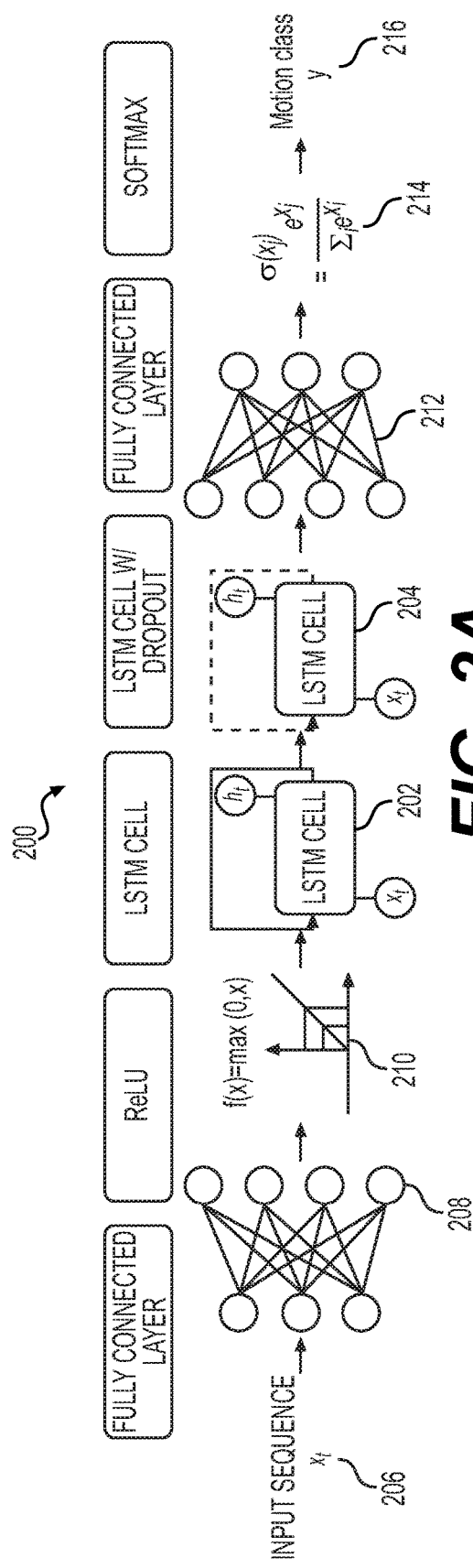
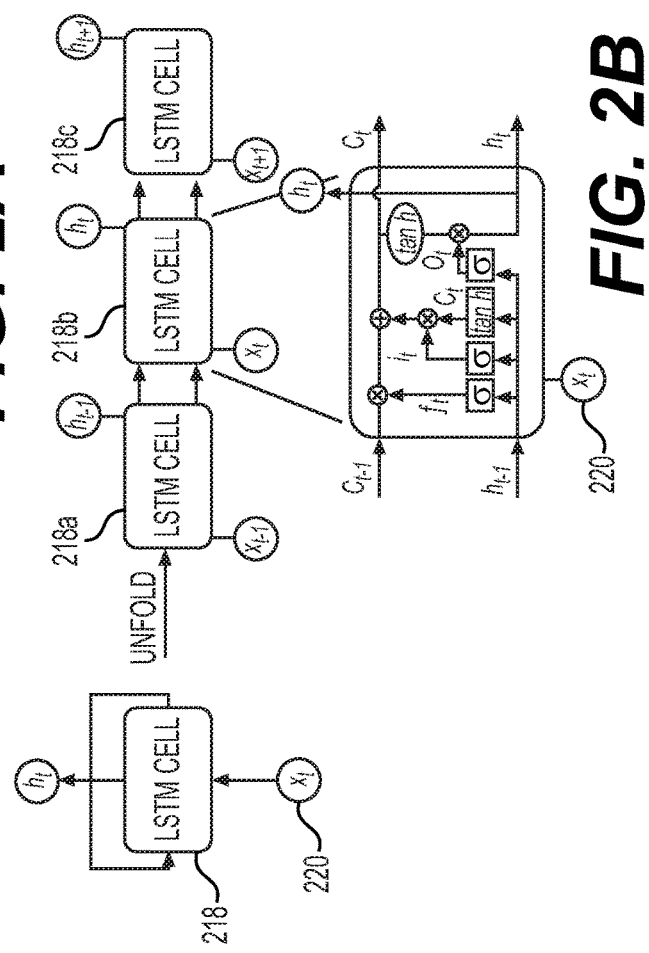
FIG. 2A
FIG. 2B

| METHOD | THE NUMBER OF SENSORS | LOCATION(S) OF THE SENSORS | THE NUMBER OF CLASSES | ACCURACY |
| --- | --- | --- | --- | --- |
| k-NN [21] | 1 | ARM | 5 | 79.79% |
| MULTI-CLASS SVM [28] | 1 | WRIST | 4 | 88.10% |
| CONVOLUTIONAL LSTM [31] | 5 | HEAD, ARM, CHEST, THIGH, AND CALF | 8 | 85.20% |
| RF IN THIS STUDY | 2 | HIP AND NECK | 13 | 82.39% |
| THE DEVELOPED LSTM | 2 | HIP AND NECK | 11 | 94.73% |

*FIG. 4D*

DATA COLLECTION DEVICES

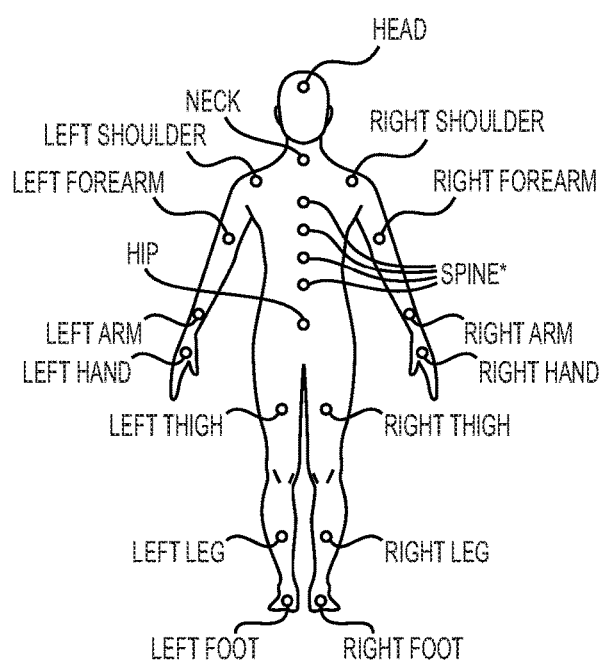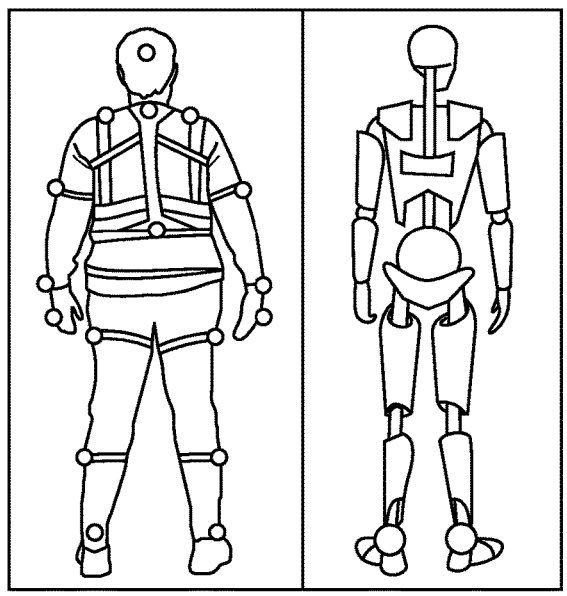
*FIG. 8A*  *FIG. 8B*  *FIG. 8C*

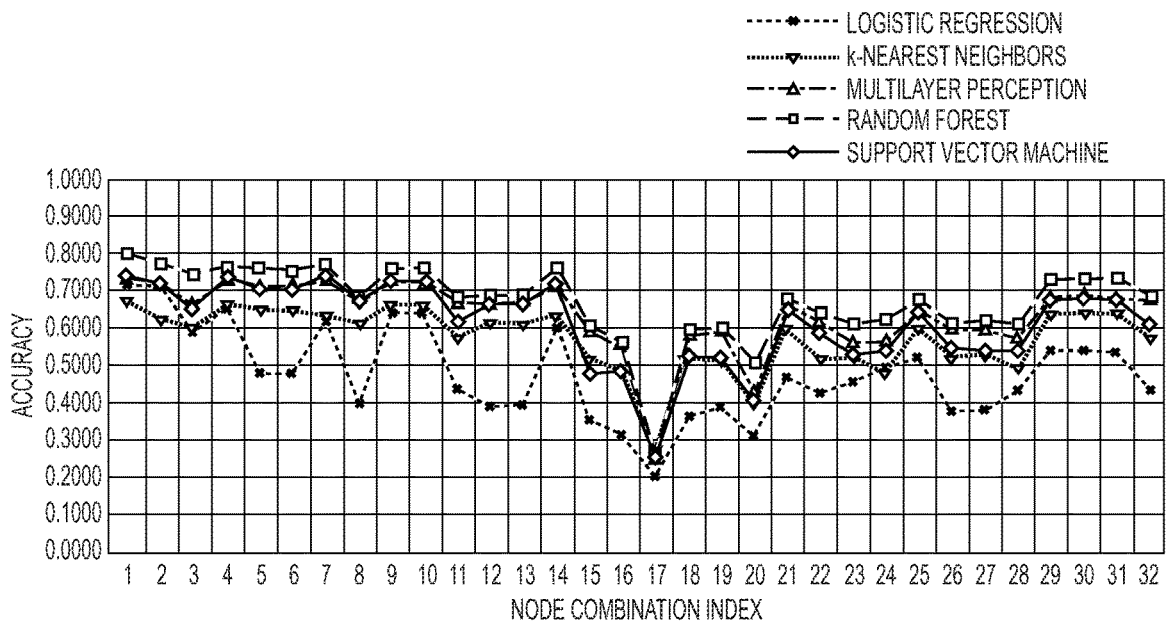

FIG. 9A

| COMBI. | SELECTED NODES (THE NUMBER OF NODES) | ACCURACY | COMBI. | SELECTED NODES (THE NUMBER OF NODES) | ACCURACY |
|---|---|---|---|---|---|
| 1 | ALL NODES (21) | 0.7983 | 17 | RIGHT FOOT (1) | 0.2791 |
| 2 | UPPER BODY (15) | 0.7729 | 18 | RIGHT THIGH (1) | 0.5941 |
| 3 | LOWER BODY (7) | 0.7440 | 19 | LEFT LEG (1) | 0.5973 |
| 4 | CORE NODES (7) | 0.7658 | 20 | LEFT FOOT (1) | 0.5090 |
| 5 | HIP AND HEAD (2) | 0.7617 | 21 | RIGHT SHOULDER (1) | 0.6844 |
| 6 | HIP AND NECK (2) | 0.7544 | 22 | RIGHT ARM (1) | 0.6431 |
| 7 | HIP AND SPINE (5) | 0.7713 | 23 | RIGHT FOREARM (1) | 0.6134 |
| 8 | HEAD AND NECK (2) | 0.6811 | 24 | RIGHT HAND (1) | 0.6222 |
| 9 | HEAD AND SPINE (5) | 0.7606 | 25 | LEFT SHOULDER (1) | 0.6762 |
| 10 | NECK AND SPINE (5) | 0.7635 | 26 | LEFT ARM (1) | 0.6158 |
| 11 | HIP (1) | 0.6849 | 27 | LEFT FOREARM (1) | 0.6171 |
| 12 | HEAD (1) | 0.6893 | 28 | LEFT HAND (1) | 0.6110 |
| 13 | NECK (1) | 0.6871 | 29 | SPINE 3 (1) | 0.7298 |
| 14 | SPINE (4) | 0.7639 | 30 | SPINE 2 (1) | 0.7310 |
| 15 | RIGHT THIGH (1) | 0.6032 | 31 | SPINE 1 (1) | 0.7365 |
| 16 | RIGHT LEG (1) | 0.5658 | 32 | SPINE 0 (1) | 0.6833 |

FIG. 9B

TRACKING AND ALERT METHOD AND SYSTEM FOR WORKER PRODUCTIVITY AND SAFETY

CROSS-REFERENCE TO RELATED APPLICATION

This is a US national stage application of International PCT application PCT/OS2020/023270, filed Mar. 18, 2020, entitled, "Tracking and Alert Method and System for Worker Productivity and Safety," which claims priority under 35 U.S.C § 119 (e) to, and the benefit of, U.S. Provisional Patent Application No. 62/820,047, filed Mar. 18, 2019, entitled "Bluetooth Indoor Tracking System for Construction Safety and Productivity Applications," and to U.S. Provisional Patent Application No. 62/820,040, filed Mar. 18, 2019, entitled "Proximity Sensing System with the developed processing hardware for Construction Safety," each of which is hereby incorporated by reference herein in its entirety.

STATEMENT OF GOVERNMENT INTEREST

This invention was made with government support under IIP-1513589 and 1919068 awarded by the National Science Foundation. The government has certain rights in the invention.

FIELD

This disclosure relates to a monitoring system, particularly for productivity and safety monitoring. This disclosure also relates to a safety alert system.

BACKGROUND

Construction tasks generally involve labor-intensive physical activities. Though smart devices and wearable devices are becoming more prevalent in today's society, using them in a meaningful and economically viable manner to improve worker efficiency and safety is still nevertheless a challenge.

One class of devices facilitates the tracking of workers on a work site to ascertain head count and tardiness. The device itself when worn by a worker may include a self-alert transponder to detect falls and to request emergency assistance.

Notably, many of these tracking system often employ dedicated networking infrastructure that are installed at a given site. Given the evolving and complex environment of a construction site where the physical infrastructure is being built or manipulated, such networking infrastructure are difficult to install and maintain.

SUMMARY

An exemplary method and system is disclosed that facilitates the monitoring of worker's productivity and safety, for example, at a construction site and other like labor-intensive occupation and settings. The exemplary method and system provides wearable-based motion sensing. A study discussed herein suggests that sensing at two or more torso locations can provide 95% accuracy in classifying worker's action or motion at a construction site. Additional sensors may be employed, e.g., at the extremities to improve accuracy of other motions and tasks. Of course, similar techniques may be performed for other work environments to ascertain nominal or optimal configurations of motion sensing. In some embodiments, as discussed herein, the acquired sensed data are transmitted, over a mesh network, e.g., established between the wearable devices, to a cloud infrastructure to facilitate the real-time monitoring of action and actions that such sites.

In another aspect, a proximity-based sensing alert system is disclosed for hazardous work environment. The proximity-based sensing alert system may operate as a standalone system or in conjunction with the tracking system disclosed herein.

In another aspect, a productivity and safety tracking system is disclosed comprising a plurality of portable personal tracking apparatus attachable to a safety vest or garment, including a first portable personal tracking apparatus and a second portable personal tracking apparatus, wherein the first portable personal tracking apparatus is attachable to the safety vest or garment at a first torso location of the safety vest or garment, wherein the second portable personal tracking apparatus is attachable to the safety vest or garment at a second torso location of the safety vest or garment, and wherein each of the first and second portable personal tracking apparatus comprises respective inertial measurement sensor unit configured to measure a measurand selected from the group consisting of acceleration, angular velocity, and magnetic field; a respective radio transceiver; a controller unit operatively coupled to the respective radio transceiver and respective inertial measurement sensor unit, wherein the first portable personal tracking apparatus is configured, by computer readable instructions, to generate a first inertial measurement data set associated with motion of the first torso location, wherein the second portable personal tracking apparatus is configured, by computer readable instructions, to generate a second inertial measurement data set associated with motion of the second torso location, and wherein the first and second inertial measurement data sets are subsequently used, in a motion recognition classification operation, to identify a sequenced motion from a set of candidate sequenced motion of a person.

In some embodiments, the productivity and safety tracking system further comprises a third portable personal tracking apparatus, wherein the third portable personal tracking apparatus is attachable to an extremity, wherein the third portable personal tracking apparatus is configured, by computer readable instructions, to generate a third inertial measurement data set associated with motion of the extremity, and wherein the first, second, and third inertial measurement data sets are subsequently used, in the motion recognition classification operation, to identify the sequenced motion from the set of candidate sequenced motion of a person.

In some embodiments, the motion recognition classification operation is performed by i) a first machine learning classification operation trained from data sets associated with motion and movement of a set of persons to identify one or more movement instances and ii) a second machine learning classification operation trained from data sets associated with motion and movement of a set of persons (e.g., wherein the data set can be the same or different between the two learnings) to identify the candidate sequenced motion using the identified one or more movement instances.

In some embodiments, the first machine learning classification operation is selected from the group consisting of logistic regression, k-nearest neighbor, multilayer perceptron, random forest, and support vector machine.

In some embodiments, the second machine learning classification operation is performed by an artificial recurrent neural network.

In some embodiments, the second machine learning classification operation comprises a Long Short-Term Memory (LSTM) network model.

In some embodiments, the second machine learning classification operation comprises a multi-stacked Long Short-Term Memory (LSTM) network model (e.g., a two-stacked LSTM network model) or a combinational Long Short-Term Memory (LSTM) network model (e.g., a LSTM network model combined with another model).

In some embodiments, the second machine learning classification operation is performed by a model configured to learn sequential information having temporal relationships on a long-time scale.

In some embodiments, the first and second inertial measurement data set are concatenated to form an input vector for the classification or classifier training.

In some embodiments, the data sets associated with motion and movement includes, at least, measured data associated with a person standing, bending-up, bending, bending-down, squatting-up, squatting, walking, twisting, working overhead, and kneeling.

In some embodiments, the respective inertial measurement sensor unit of the first portable personal tracking apparatus includes, at least, a 3-axis gyroscope, a 3-axis accelerometer, and a 3-axis digital compass (i.e., 9-axis sensor).

In some embodiments, the controller unit of the first portable personal tracking apparatus and is operatively coupled to the respective radio transceiver to determine a signal strength value for a transmitted signal sent from a low-power short-range beacon (e.g., Bluetooth Low Energy device), the first portable personal tracking apparatus further comprising a low-power communication device (e.g., Zigbee, Wi-fi, Bluetooth, Thread) to establish a plurality of links with one or more portable personal tracking apparatuses of other productivity and safety tracking system to form a mesh network, wherein the controller unit of the first portable personal tracking apparatus is configured, by computer readable instructions, to transmit, at least, the first inertial measurement data set (e.g., as well as the second inertial measurement data set) in a plurality of datagrams, through the mesh network, to a gateway networking device, and wherein the gateway networking device is configured to transmit the received proximity event data messages to one or more remote computing devices.

In some embodiments, at least one of the remote computing devices comprises a cloud server, a remote server, or a local server, wherein the remote computing device is configured to store the transmitted proximity event data to be subsequently presented, through curation operation performed by the one or more remote computing devices or another computer device, at a monitoring application executing at a monitoring terminal.

In some embodiments, at least one of the plurality of portable personal tracking apparatus is configured to generate an audible and/or vibratory alert based on sensed proximity to safety-associated beacon.

In another aspect, a method is disclosed of monitoring productivity and safety, the method comprising retrieving, through a network, at a monitoring computing device (e.g., backend servers), one or more inertial measurement data sets having been acquired from a portable personal tracking apparatus attached to a safety vest or garment, wherein the one or more inertial measurement data sets includes inertial measurement data acquired at a first torso location of the safety vest or garment and inertial measurement data acquired at a second torso location of the safety vest or garment; classifying, at the monitoring computing device, sequenced motion of a person wearing the safety vest or garment using the retrieved one or more inertial measurement data sets, wherein the classified sequenced motion is selected from the group of a person standing, bending-up, bending, bending-down, squatting-up, squatting, walking, twisting, working overhead, and kneeling; and storing, at the monitoring computing device, the classified sequenced motion, wherein the classified sequenced motion is subsequently curated to at a monitoring application executing at a monitoring terminal for the monitoring of productivity or safety of the person.

In some embodiments, the method further includes presenting, at the monitoring terminal, via a web-based or local GUI interface, frequency or duration of a given sequenced motion for a given work shift, day, week, or month.

In some embodiments, the method further includes presenting, at the monitoring terminal, via the web-based or local GUI interface, task associated sequenced motions for the given work shift, day, week, or month, wherein task associated sequenced motions comprises two or more defined sequenced motions associated with a given productivity task.

In some embodiments, the method further includes presenting, at the monitoring terminal, via the web-based or local GUI interface, frequency or duration of a safety event associated with a sensed proximity to safety-associated beacon for the given work shift, day, week, or month.

In some embodiments, the method further includes acquiring, at the portable personal tracking apparatus, the one or more inertial measurement data sets, wherein the portable personal tracking apparatus an inertial measurement sensor unit that includes, at least, a 3-axis gyroscope, a 3-axis accelerometer, and a 3-axis digital compass.

In some embodiments, the method further includes transmitting, from the portable personal tracking apparatus, to the monitoring computing device, the one or more inertial measurement data sets through a mesh network, as the network, established across a plurality of portable personal tracking apparatuses.

In some embodiments, the method further includes generating, at the monitoring terminal, an alert for a sensed motion associated with a person lying down.

In another aspect, a personal or equipment protection apparatus (e.g., PPU or EPU core) is disclosed comprising a radio transceiver; an ultra-low power multi-protocol system-on-module (SOM) unit operatively coupled to the radio transceiver to determine a signal strength value for a transmitted signal sent from a low-power short-range beacon (e.g., Bluetooth Low Energy device); and one or more alert devices each operatively coupled to the ultra-low power multi-protocol system-on-module (SOM) unit, wherein the one or more alert devices is configured, by computer readable instructions, to generate warning sound, a warning visual output, or a vibrational output based on the determined signal strength value, wherein the determined signal strength value is indicative of the personal or equipment protection apparatus being within a predetermined proximity to the low-power short-range beacon.

In some embodiments, the personal or equipment protection apparatus further includes a low-power communication device (e.g., Zigbee, Wi-fi, Bluetooth, Thread), the SOM unit being coupled to the low-power communication device to establish a plurality of links with one or more second personal or equipment protection apparatuses to form a mesh network, the SOM unit being configured, by computer readable instructions, to generate a proximity event data message and to transmit the generated proximity event data message, through the low-power communication device, and across one or more personal or equipment protection apparatuses in the mesh network, to a gateway networking device, wherein the gateway networking device is configured, by computer readable instructions, to transmit the received proximity event data messages to a remote computing device.

In some embodiments, the remote computing device comprises a cloud server, a remote server, or a local server, wherein the remote computing device is configured to store the transmitted proximity event data messages to be subsequently presented, through curation operation performed by the remote computing device or another computer device, at a monitoring application executing at a monitoring terminal.

In some embodiments, the monitoring application is configured to generate an incident report based on the transmitted proximity event data messages.

In some embodiments, the low-power short-range beacon comprises a Bluetooth Low Energy (BLE) device and wherein the SOM unit is configured to perform an extended Kalman filter operation or a particle filter operation of the transmitted signal sent from a low-power short-range beacon.

In some embodiments, the one or more alert devices comprises a vibration motor configured to generate a mechanical tremor in a range of 5-20 Hz.

In some embodiments, the personal or equipment protection apparatus further includes a power unit comprising a rechargeable circuitry coupled to at least one rechargeable battery.

In some embodiments, the personal or equipment protection apparatus further includes a global-positioning system (GPS) transceiver unit configured to measure GPS positioning of the personal or equipment protection apparatus, wherein the SOM unit is configured, by computer readable instructions, to generate GPS data messages to transmit, through the low-power communication device, and across one or more personal or equipment protection apparatuses in the mesh network, to the remote computing device.

In some embodiments, the personal or equipment protection apparatus further includes an inertial measurement unit (IMU) configured to measure at least one force, inertia, and orientation, wherein the SOM unit is operatively coupled the IMU and is configured, by computer readable instructions, to generate an IMU data messages to transmit, through the low-power communication device, and across one or more personal or equipment protection apparatuses in the mesh network, to the remote computing device, wherein the IMU data messages are used to monitor.

In some embodiments, the one or more alert devices comprises a visual indicator that is actuated when the warning visual output is generated.

In some embodiments, the one or more alert devices comprises a plurality of visual indicators, wherein a visual indicator of the plurality of visual indicators is actuated when the warning visual output is generated, and wherein the actuated visual indicator corresponds to a direction of the transmitted signal sent from the low-power short-range beacon.

In some embodiments, the visual indicator of the plurality of visual indicators is actuated when the warning visual output is generated, and wherein the actuated visual indicator corresponds to a direction of a nearby personal or equipment protection apparatus.

In some embodiments, the personal or equipment protection apparatus further includes a wrist attachable housing and strap that is attachable to a wrist of a person, the wrist attachable housing having disposed therein the radio transceiver, the ultra-low power multi-protocol system-on-module (SOM) unit, and the one or more alert devices.

In some embodiments, the personal or equipment protection apparatus further includes a housing having disposed therein the radio transceiver, the ultra-low power multi-protocol system-on-module (SOM) unit, and the one or more alert devices, wherein the housing is configured to be inserted into a body-worn safety vest.

In another aspect, a cloud-based monitoring system is disclosed comprising a plurality of low-power short-range beacons; a plurality of personal or equipment protection apparatuses each of the plurality of personal or equipment protection apparatuses comprising i) a radio transceiver, ii) an ultra-low power multi-protocol system-on-module (SOM) unit operatively coupled to the radio transceiver to determine a signal strength value for a transmitted signal sent from a low-power short-range beacon of the plurality of low-power short-range beacons, and iii) one or more alert devices each operatively coupled to the ultra-low power multi-protocol system-on-module (SOM) unit, wherein the one or more alert devices is configured to generate warning sound, a warning visual output, or a vibrational output based on the determined signal strength value, wherein the determined signal strength value is indicative of the personal or equipment protection apparatus being within a predetermined proximity to the low-power short-range beacon, and iii) a low-power communication device (e.g., Zigbee, Wi-fi, Bluetooth, Thread) to establish a plurality of links with one or more second personal or equipment protection apparatuses to form a mesh network; and one or more server services (e.g., remote server or cloud platform) configured to store proximity event data set having data acquired from the plurality of personal or equipment protection apparatuses having been transmitted to a gateway networking device over the mesh network, wherein the one or more server services is configured to curate the proximity event data set to a monitoring application executing at a monitoring terminal.

In some embodiments, the one or more server services is configured, by computer readable instructions, to generate statistics associated with a frequency of generated warning sound, warning visual output, or vibrational output.

In some embodiments, the plurality of personal or equipment protection apparatuses includes at least one personal or equipment protection apparatus described above.

In another aspect, a method is disclosed comprising determining, at a personal or equipment protection apparatus, a proximity value associated with transmission of a short-range signal (e.g., signal strength) from at least one low-power short-range beacon; determining, at the personal or equipment protection apparatus, a proximity event using the determined proximity value, wherein the proximity event corresponds to the personal or equipment protection apparatus being within a predetermined proximity to the at least one low-power short-range beacon; and generating, at the personal or equipment protection apparatus, a warning sound and/or warning vibration based on the determined proximity event.

In some embodiments, the method further includes transmitting, from the personal or equipment protection apparatus, through a mesh network established by one or more second personal or equipment protection apparatuses, to a gateway computing device operatively communicating with a remote computing device, a proximity data message associated with the determined proximity value, wherein the remote computing device is selected from the group consisting of a cloud server, a remote server, and a local server, wherein the remote computing device is configured, by computer readable instructions, to store the transmitted proximity data message, and wherein the determined proximity values of the transmitted proximity data message are subsequently presented, through curation operation performed by the remote computing device or another computer device, at a monitoring application executing at a monitoring terminal.

Other aspects and features according to the example embodiments of the disclosed technology will become apparent to those of ordinary skill in the art, upon reviewing the following detailed description in conjunction with the accompanying figures.

BRIEF DESCRIPTION OF THE DRAWINGS

The skilled person in the art will understand that the drawings, described below, are for illustration purposes only.

FIG. 1 is an exemplary productivity and safety tracking system in accordance with an illustrative embodiment.

FIG. 2A shows an architecture of the two-stacked LSTM network in accordance with an illustrative embodiment.

FIG. 2B shows a diagram of each of the LSTM network in the two-stacked network of FIG. 2A in accordance with an illustrative embodiment.

FIG. 4D shows comparative results of the LSTM network of FIG. 2 as compared to other machine learning network in accordance with an illustrative embodiment.

FIG. 8A shows a diagram of the body joints and body parts that comprised the construction-tasks body node definition in accordance with an illustrative embodiment.

FIG. 8B shows a person configured with a wearable sensor at each of the joints and parts of FIG. 8A in accordance with an illustrative embodiment.

FIG. 8C shows a segmented motion model of a person generated from the wearable sensor system of FIG. 8B in accordance with an illustrative embodiment.

FIG. 9A shows the overall accuracy of the five evaluated machine learning classifiers in accordance with an illustrative embodiment.

FIG. 9B shows the accuracy of the random forest classifier for all motion defined node combinations in accordance with an illustrative embodiment.

DETAILED DESCRIPTION

Figure 3A:
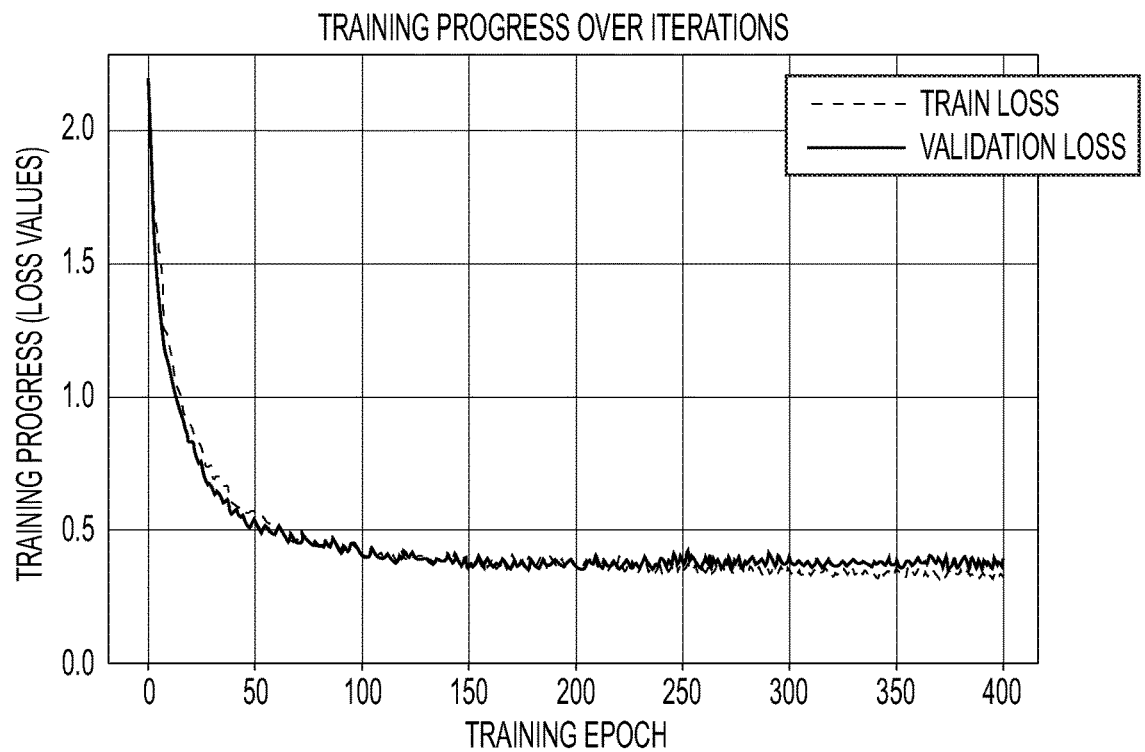
FIGS. 3A and 3B respectively shows the losses and accuracy over iterations with the tuned hyper-parameters as a quantification of the training quality in accordance with an illustrative embodiment

Although example embodiments of the disclosed technology are explained in detail herein, it is to be understood that other embodiments are contemplated. Accordingly, it is not intended that the disclosed technology be limited in its scope to the details of construction and arrangement of components set forth in the following description or illustrated in the drawings. The disclosed technology is capable of other embodiments and of being practiced or carried out in various ways.

It must also be noted that, as used in the specification and the appended claims, the singular forms "a," "an" and "the" include plural referents unless the context clearly dictates otherwise. Ranges may be expressed herein as from "about" or "approximately" one particular value and/or to "about" or "approximately" another particular value. When such a range is expressed, other exemplary embodiments include from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the disclosed technology. Similarly, it is also to be understood that the mention of one or more components in a device or system does not preclude the presence of additional components or intervening components between those components expressly identified.

In the following description, references are made to the accompanying drawings that form a part hereof and that show, by way of illustration, specific embodiments or examples. In referring to the drawings, like numerals represent like elements throughout the several figures.

Some references, which may include various patents, patent applications, and publications, are cited in a reference list and discussed in the disclosure provided herein. The citation and/or discussion of such references is provided merely to clarify the description of the disclosed technology and is not an admission that any such reference is "prior art" to any aspects of the disclosed technology described herein. In terms of notation, "[n]" corresponds to the nth reference in the list. For example, refers to the 41st reference in the list, namely F. Ordóñez, D. Roggen, "Deep convolutional and LSTM recurrent neural networks for multimodal wearable activity recognition," Sensors 16 (2016) 115. All references cited and discussed in this specification are incorporated herein by reference in their entireties and to the same extent as if each reference was individually incorporated by reference.

Example System

FIG. 1 is an exemplary productivity and safety tracking system 100 (also referred to herein as an "indoor tracking system" 100) in accordance with an illustrative embodiment. The tracking system 100 includes a plurality of portable personal tracking apparatus 102 (shown as 102a, 102b, and 102c) (also referred to herein as a personal protection unit (PPU)) attachable to a safety vest or garment and extremity of each person 104 (shown as 104a, 104b, and 104c) to provide data for worker motion and action recognition for the monitoring of productivity and safety. As shown in FIG. 1, the tracking system 100 includes a first portable personal tracking apparatus 102a, a second portable personal tracking apparatus 102b, and a third portable personal tracking apparatus 102c.

The portable personal tracking apparatus, in some embodiments, includes an ultra-low power multiprotocol System on Module (SOM) that serves as a main controller. The controller is capable of communicating with other devices or a cloud server, e.g., via Thread, Zigbee, and Bluetooth 5 communication protocols. The devices also embed various sensors such as IMU and GPS for identifying the current behavior and location of a worker. The portable personal tracking apparatus (e.g., 102) is configured to send the acquired measurand data to a remote server for monitoring. When the portable personal tracking apparatus (e.g., 102) is out of the range of the network to transmit the information, it is configured to temporarily store the acquired data locally (e.g., on a memory card or the like) to which it can transmits to the server when available. A high-capacity portable energy storage modules is used (e.g., Li-ion battery pack) to power the portable personal tracking apparatus 102. The portable personal tracking apparatus 102 may be configured to recharge (e.g., using standard interconnects, e.g., USB micro b interface or USB Type-C interface). The portable personal tracking apparatus 102 is configured to operate with minimal power consumption to enhance the battery lifetime.

In some embodiments, fewer numbers of portable personal tracking apparatus may be used for a given worker. In other embodiments, higher numbers of portable personal tracking apparatus may be used for a given worker. In some embodiments, the portable personal tracking apparatus is be configured with multiple sensors that can be disposed at different locations on the safety vest or garments.

Each portable personal tracking apparatus 102 (e.g., 102a, 102b, 102c) is configured with an inertial measurement sensor unit configured, with sensors, to measure a measurand such as acceleration, angular velocity, magnetic field, or a combination thereof. In some embodiments, the tracking system 100 is configured to acquire GPS data, temperature data, humidity data. In some embodiments, the portable personal tracking apparatus 102 is configured to acquire audio recording. In some embodiments, the portable personal tracking apparatus 102 is configured to a tactile input from the wearer.

As shown in FIG. 1, in some embodiments, the first portable personal tracking apparatus 102a is configured, by computer readable instructions, to generate a first inertial measurement data set associated with motion at a first torso location of the wearer, and the second portable personal tracking apparatus 102b is configured, by computer readable instructions, to generate a second inertial measurement data set associated with motion of a second torso location of the wearer. In some embodiments, a third portable personal tracking apparatus 102c is used to generate a third inertial measurement data set associated with motion at an extremity of the wearer (e.g., wrist, ankle). The tracking system 100 is configured for low-power operation to acquire data concurrently throughout one or more days or work-shift. As later discussed herein, such sensor locations have been experimentally shown to be particularly beneficial in accurately ascertaining actions and motions associated with construction work, including, e.g., standing, bending, squatting, walking, twisting, working overhead, kneeling, bending-up, bending-down, squatting-up, and squatting-down. Other data and sensor configuration may be used according to the methodology described herein.

In some embodiments, each portable personal tracking apparatus 102 has a same configuration as other portable personal tracking apparatuses 102. In other embodiments, the portable personal tracking apparatus 102 has a common configuration (e.g., sensors and short-range communication device) to establish a mesh network with a nearby portable personal tracking apparatus 102. In some embodiments, the portable personal tracking apparatus 102 has different sensor configurations. In some embodiments, the portable personal tracking apparatus 102 (e.g., 102a) is configured with different communication device, e.g., configured with higher bandwidth or longer-distance communication (e.g., as a gateway).

In some embodiments, the portable personal tracking apparatus is configured to operate with external beacons and to determine proximity to such beacons. In some embodiments, the portable personal tracking apparatus is configured to sense the signal strength from the beacons, e.g., attached to equipment to estimate the proximity to the equipment.

The tracking system 100 includes, in some embodiments, a cloud-based monitoring system. The portable personal tracking apparatus 102 operatively communicates to a gateway device 106 that connects, over a high-speed network, to a set of remote computing devices 116 (shown as 116a, 116b, 116c), e.g., established in a cloud infrastructure platform 110. The remote computing devices 116 may be connected to one or more storage area network devices 108. Though preferably implemented in a cloud-based infrastructure, the remote computing devices 116 may be implemented as a remote server or a local server to which some of the remote computing devices 116 may provide services (e.g., web-based services) to curate intrusion-associated data sets to one or more monitoring applications (e.g., web-based applications) executing at corresponding monitoring terminals (shown as 112a, 112b).

As shown in FIG. 1, data acquired from portable personal tracking apparatus 102 are transmitted over the mesh network formed of other portable personal tracking apparatuses 102 to the gateway device 106. The mesh network system formed of portable personal tracking apparatus 102 provides a portable network infrastructure that can operate with minimum on-site network infrastructure.

The personal tracking apparatus 102 is configured to transmit sensor data set, or event information, through the mesh network to other personal tracking apparatus 102. In some embodiments, the personal tracking apparatus 102 is configured to generate output of an alert warning. The remote computing device 116 may provide real-time and aggregated monitoring of productivity and actions at the monitoring station (e.g., 112a, 112b). In some embodiments, the remote computing device 116 is configured to generate an alert notification.

Computer-executable instructions, such as program modules, being executed by a computer may be used. Generally, program modules include routines, programs, objects, components, data structures, etc. that perform particular tasks or implement particular abstract data types. In its most basic configuration, the controller of FIG. 1 includes at least one processing unit and memory. Depending on the exact configuration and type of computing device, memory may be volatile (such as random-access memory (RAM)), non-volatile (such as read-only memory (ROM), flash memory, etc.), or some combination of the two. The controller of FIG. 1 may have additional features/functionality. For example, the personal tracking apparatus (e.g., 102) may include additional storage (removable and/or non-removable) including, but not limited to, magnetic or optical disks or tape. Such additional storage may include removable storage and/or non-removable storage.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as EEPROM, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, handheld devices, and wearable devices, for example.

LSTM Network for Construction Worker Motion and Action Recognition

FIGS. 2A and 2B illustrate a two-stacked LSTM network 200 configured to classify construction worker motion or action using data, e.g., acquired from the tracking system 100 of FIG. 1, in accordance with an illustrative embodiment. The LSTM network 200 includes a first LSTM cell 202 connected in cascade to a second LSTM cell 204. In some embodiments, the number of layers may be increased, e.g., to evaluate and/or classify more complex or number of actions. FIG. 2A shows an architecture of the two-stacked LSTM network 200. FIG. 2B shows a diagram of each of the LSTM network in the two-stacked network.

As shown in FIG. 2A, an input vector 206 (shown as "Input sequence X" 206) is fed into a fully connected layer 208 followed by a Rectified Linear Unit (ReLU) layer 210, e.g., as described in Y. Zhao, R. Yang, G. Chevalier, M. Gong, Deep residual Bidir-LSTM for human activity recognition using wearable sensors, Math. Probl. Eng. 2018 (2018), which is incorporated by reference herein. ReLU is one of the activation functions that have been widely used because it outperforms the sigmoid function. The LSTM network 200 implements dropout technique in the second LSTM cells 204 to regularize the network 200 to allows the network to avoid overfitting and improve performance. In the case of LSTM, the dropout technique excludes the recurrent components such as input, output, and hidden state from the update process probabilistically. As shown in FIG. 2, at the second LSTM cell layer 204, the last output of the sequence of the input vectors is fed into a fully connected layer 212. The output of the fully connected layer 212 is fed into a Softmax layer 214 to convert class scores into probabilities so that the motion with the highest probability can be identified (shown as "Motion class y" 216).

Indeed, the LSTM model 200 is configured to consider a sequence of motions to recognize construction workers' motions by considering a sequence of previous motions. LSTM is a recurrent neural network designed to learn sequential information using memory cells that stores and outputs information facilitating the learning of temporal relationships on long time scales [41]. LSTM performs gating operations based on pointwise multiplication operations and activation functions, to selectively add information to, or remove them from, the cell the cell.

FIG. 2B is a diagram illustrating a structure of a LSTM network (e.g., 202, 204) of FIG. 2A in accordance with an illustrative embodiment. As shown in FIG. 2B, a LSTM network (e.g., 202, 204) includes a plurality of LSTM cells (shown as 218a, 218b, 218c). The LSTM cell (e.g., 218a, 218b, 218c) includes an input 220 that receives values (shown as "$X_t$," 220). The LSTM cell (e.g., 218a, 218b, 218c) further includes a hidden state $h_t$ from a previous state $h_{t-1}$ and is that configured to pass through a forget gate $f_t$. The output of the gate generally has a value between "0" and "1" that represents a complete removal of the information and complete retention of the information, respectively. The input gate takes the two values $X_t$ and $h_{t-1}$ to consider new information to be stored in the new cell state (shown as "$C_t$"). The values pass through an input modulation gate with a hyperbolic tangent activation function and may have an output value range between "−1" and "1" that reflects the amount of the information to be forgotten. The old cell state (shown as "$C_{t-1}$") may be updated into the new cell state (shown as "$C_t$") via a multiplication operation between the old cell state (shown as "$C_{t-1}$") and the output of the forget gate ($f_t$), and via an additional operation of the multiplication of the output of the input gate and input modulation gate. The output gate may take input values and the old hidden state, $X_t$ and $h_{t-1}$, using a sigmoid activation function to determine the parts of the cell state that will be the output. The cell state (shown as "$C_t$") may pass through a hyperbolic tangent function, and it may be multiplied by the output of the output gate to calculate the new hidden state (shown as "$h_t$". Using these gates, the cell state is updated. The function of the gates and their respective states are provided in Equations 1-6.

$$i_t = \sigma(W_{xi}x_t + V_{hi}h_{t-1} + b_i) \quad \text{(Equation 1)}$$

$$f_t = \sigma(W_{xf}x_t + V_{hf}h_{t-1} + b_f) \quad \text{(Equation 2)}$$

$$o_t = \sigma(W_{xo}x_t + V_{ho}h_{t-1} + b_o) \quad \text{(Equation 3)}$$

$$\tilde{C}_t = \tanh(W_{xc}x_t + V_{hc}h_{t-1} + b_c) \quad \text{(Equation 4)}$$

$$C_t = f_t \otimes C_{t-1} + i_t \otimes \tilde{C}_t \quad \text{(Equation 5)}$$

$$h_t = o_t \otimes \tanh(C_t) \quad \text{(Equation 6)}$$

In the equations, $\sigma$ is the sigmoid function defined as $\sigma(x)=(1+e^{-x})^{-1}$; the terms $i_t$, $f_t$, $o_t$, $\tilde{C}$, $C_t$, and $h_t$ are the outputs of the input gate, the forget gate, the output gate, the input modulation gate, the cell state, and the hidden state at time t, respectively; the operator $\otimes$ is a pointwise multiplication operator; the terms $W_{xi}$, $W_{xf}$, $W_{xo}$, $W_{xc}$, $V_{hi}$, $V_{hf}$, $V_{ho}$, and $V_{hc}$ are coefficient matrixes; and the terms $b_i$, $b_f$, $b_o$, and $b_c$ are bias vectors. The coefficient matrix and bias vectors are learnable parameters. These parameters and terms are updated as the LSTM model learns the information that passes through the LSTM cell.

Table 1 shows an example set of tuned hyper-parameters used to generate an LSTM model configured to recognize construction worker's action and motion in accordance with an illustrative embodiment.

TABLE 1

| Hyper-parameters | Value |
| --- | --- |
| No. of hidden units | 64 |
| L2 regularization | 0.0008 |
| Learning rate | 0.0017 |
| Number of epochs | 400 |
| Batch size | 128 |
| Dropout probability | 0.2 |

Figure 3B:
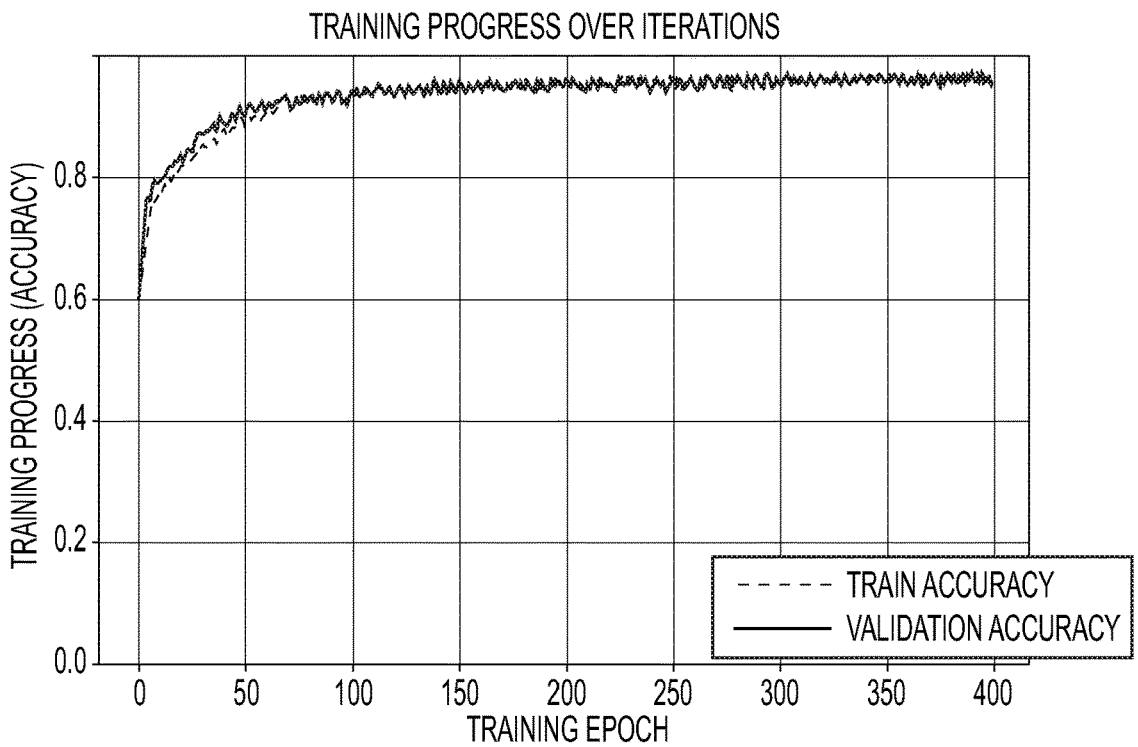

The parameters of Table 1 were tuned by adjusting the values while observing the optimization loss and accuracy of the train and validation sets. FIGS. 3A and 3B respectively shows the losses and accuracy over iterations with the tuned hyper-parameters as a quantification of the training quality in accordance with an illustrative embodiment. In FIG. 3A, the plot shows that difference in training losses and validation losses converges after 350 epochs, and the difference between train loss and validation loss indicating the model was well-trained and without over fitting.

Overfitting generally happens when a model too closely fit a particular dataset and have low performance on the unseen data. To avoid or reduce the overfitting, the LSTM network is configured with L2 regularization factor 0.0008. A dropout probability was set to 0.2 during the training process on the training set (i.e., the recurrent connections in the LSTM cells were excluded with 20% of probability). Adam optimizer was used to minimize a loss function, i.e., the cross-entropy of the result after the SoftMax function was applied. The LSTM model 300 was observed to have an accuracy of 94.73% on the test set.

Figure 4A:
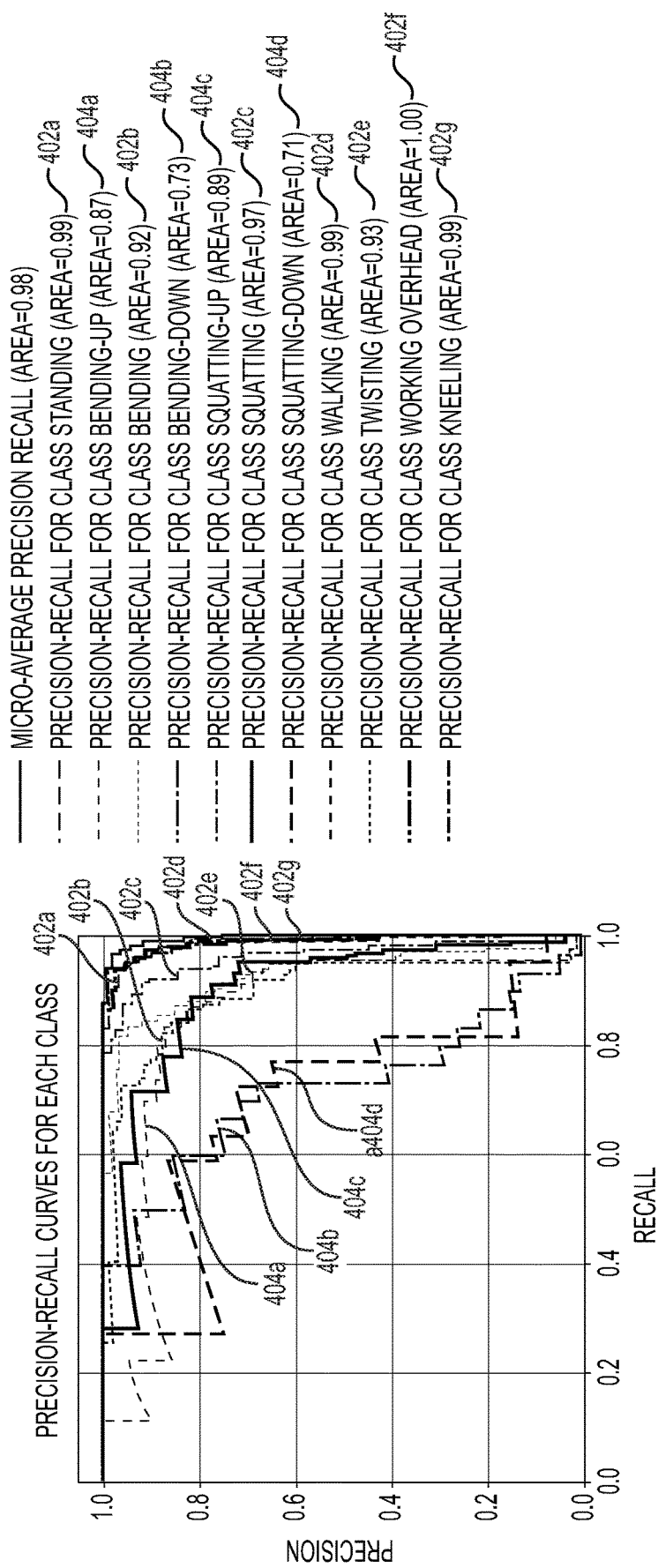
FIGS. 4A, 4B, and 4C show experimental results of LSTM network of FIG. 2 in classifying construction workers' motions in accordance with an illustrative embodiment.
Figure 4B:
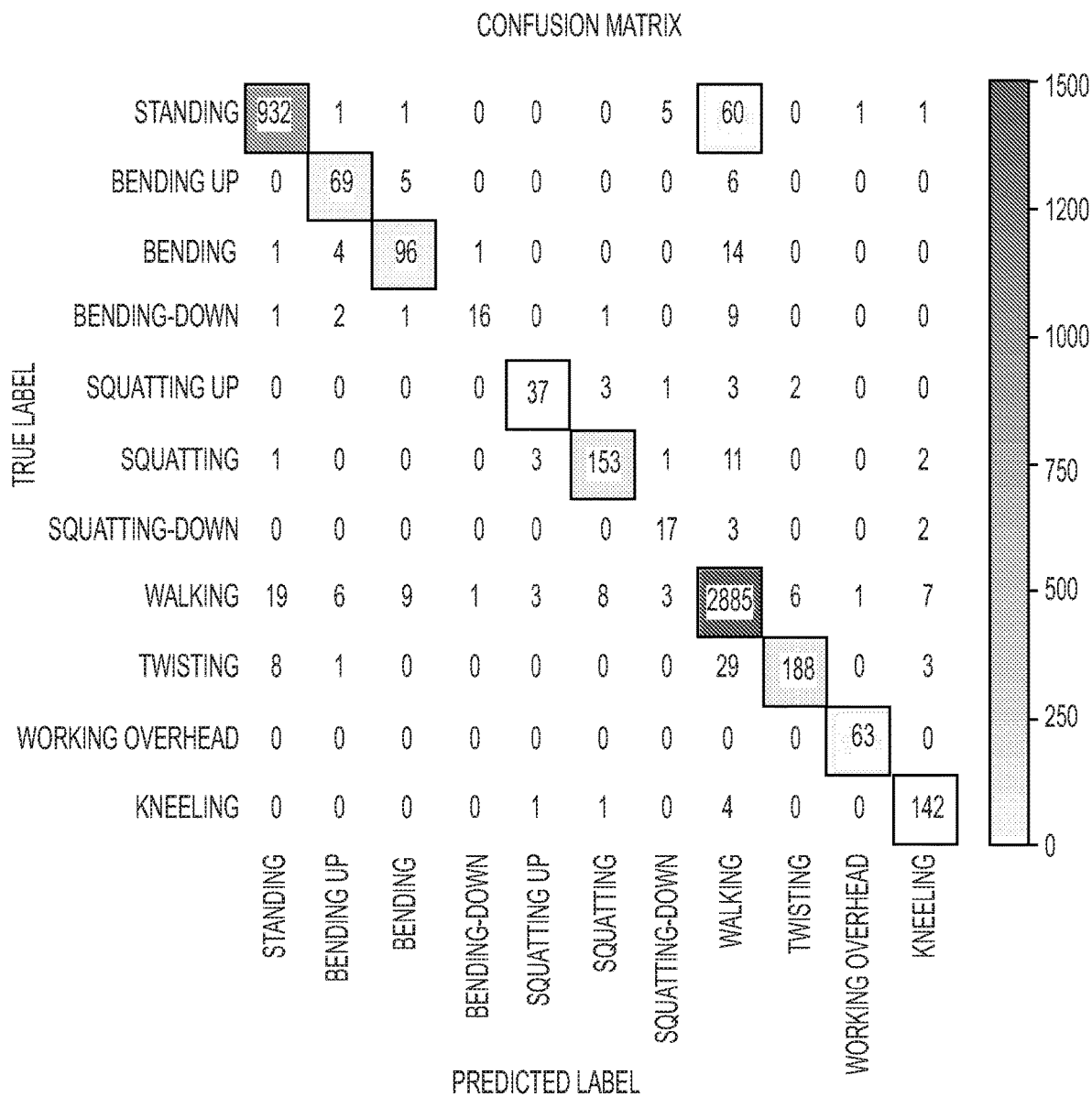
Figure 4C:
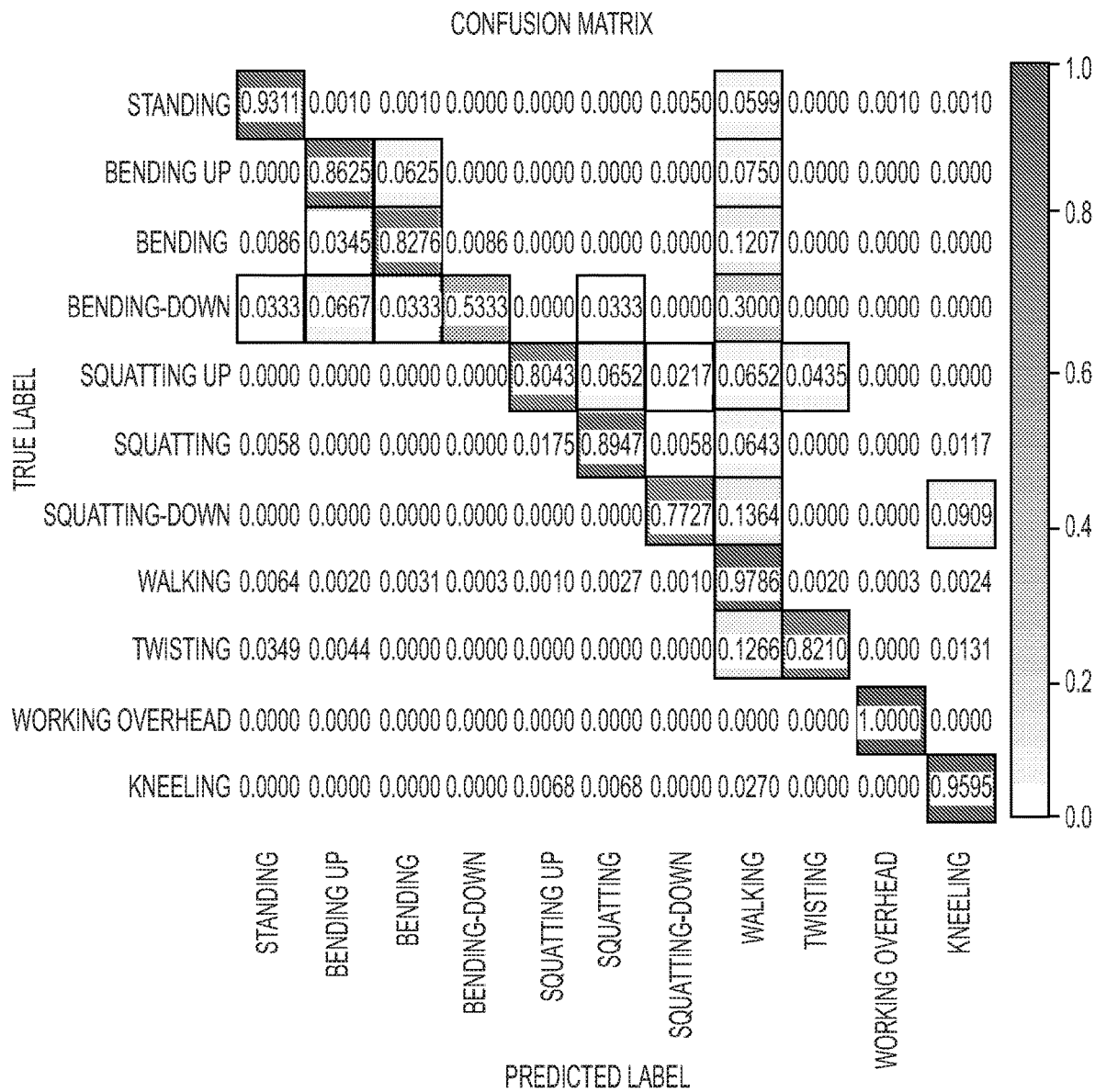

FIGS. 4A, 4B, and 4C show experimental results of LSTM network 200 in classifying construction workers' motions in accordance with an illustrative embodiment. FIG. 4D shows comparative results of the LSTM network 200 of FIG. 2 as compared to other machine learning network in accordance with an illustrative embodiment.

Specifically, FIG. 4A shows a plot of precision-recall (PR) curves for each motion class from a conducted experiment in accordance with an illustrative embodiment, including a motion for standing, bending-up, bending, bending-down, squatting-up, squatting-down, walking, twisting, working overhead, and kneeling.

Precision-recall (PR) curves are evaluation measures for classification that allows the visualization of the performance of the classifier at a range of thresholds. PR curves may be used to evaluate binary classification models trained using an imbalanced dataset where one class occupies a larger portion in the dataset than the other class. In the PR curves of FIG. 4A, better classifiers for a given motion have higher recall and precision values. In some embodiments, the curve for each of the motion class can be evaluate via an operation that calculates an area of a respective curve. As shown in FIG. 4A, sustained motions such standing, bending, squatting, walking, twisting, working overhead, and kneeling (shown as 402a, 402b, 402c, 402d, 402e, 402f, and 402h, respectively) have higher precision-recall values (e.g., higher than 0.90) as compared to transitioning motions such as bending-up, bending-down, squatting-up, and squatting-down (shown as 404a, 404b, 404c, and 404d, respectively).

FIG. 4B and FIG. 4C, respectively, shows a confusion matrix of the result without normalization and with normalization in accordance with an illustrative embodiment. The heat-map type of confusion matrix shows the results of the classification and the number of each case. The vertical axis indicates the true labels, and the horizontal axis indicates the predicted label. The diagonal values are the number of the instances classified correctly while the off-diagonal values are the number of the instances classified incorrectly.

As noted above, FIG. 4D shows comparative results of the LSTM network 200 of FIG. 2 as compared to other machine learning network in accordance with an illustrative embodiment, including a k-NN as disclosed in [21] R. Akhavian, A. H. Behzadan, Smartphone-based construction workers' activity recognition and classification, Autom. Constr. 71 (2016) 198-209; a multi-class SVM as discussed in J. Ryu, J. Seo, H. Jebelli, S. Lee, Automated action recognition using an accelerometer-embedded wristband-type activity tracker, J. Constr. Eng. Manag. 145 (2019); and a convolutional LSTM as discussed in [31] J. Zhao, E. Obonyo, Convolutional long short-term memory model for recognizing postures from wearable sensor, CEUR Workshop Proceedings, 2019 (Jan. 15, 2020).

As shown in FIG. 4D, it was found that the two stacked LSTM model 200 of FIG. 2 outperformed the existing motion and activity recognition methods with respect to accuracy, number of classes, and the number of sensors. Compared to the convolutional LSTM [31], the two stacked LSTM model 200 was observed to have higher accuracy while using fewer number of sensors to define a greater number of target classes.

Example Indoor and Construction Site Tracking System

Figure 5A:
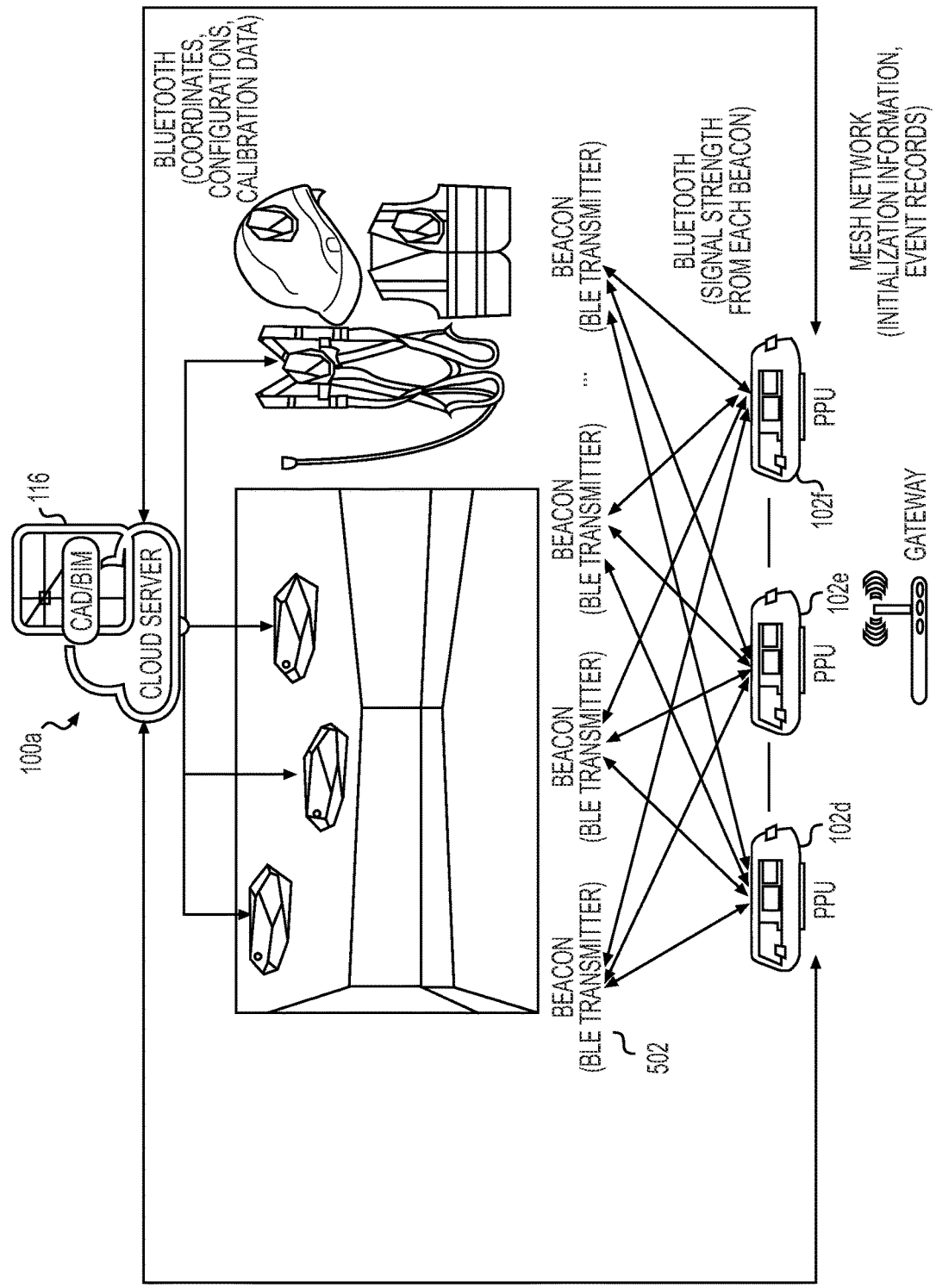
FIGS. 5A and 5B show an example tracking system in accordance with an illustrative embodiment.
Figure 5B:
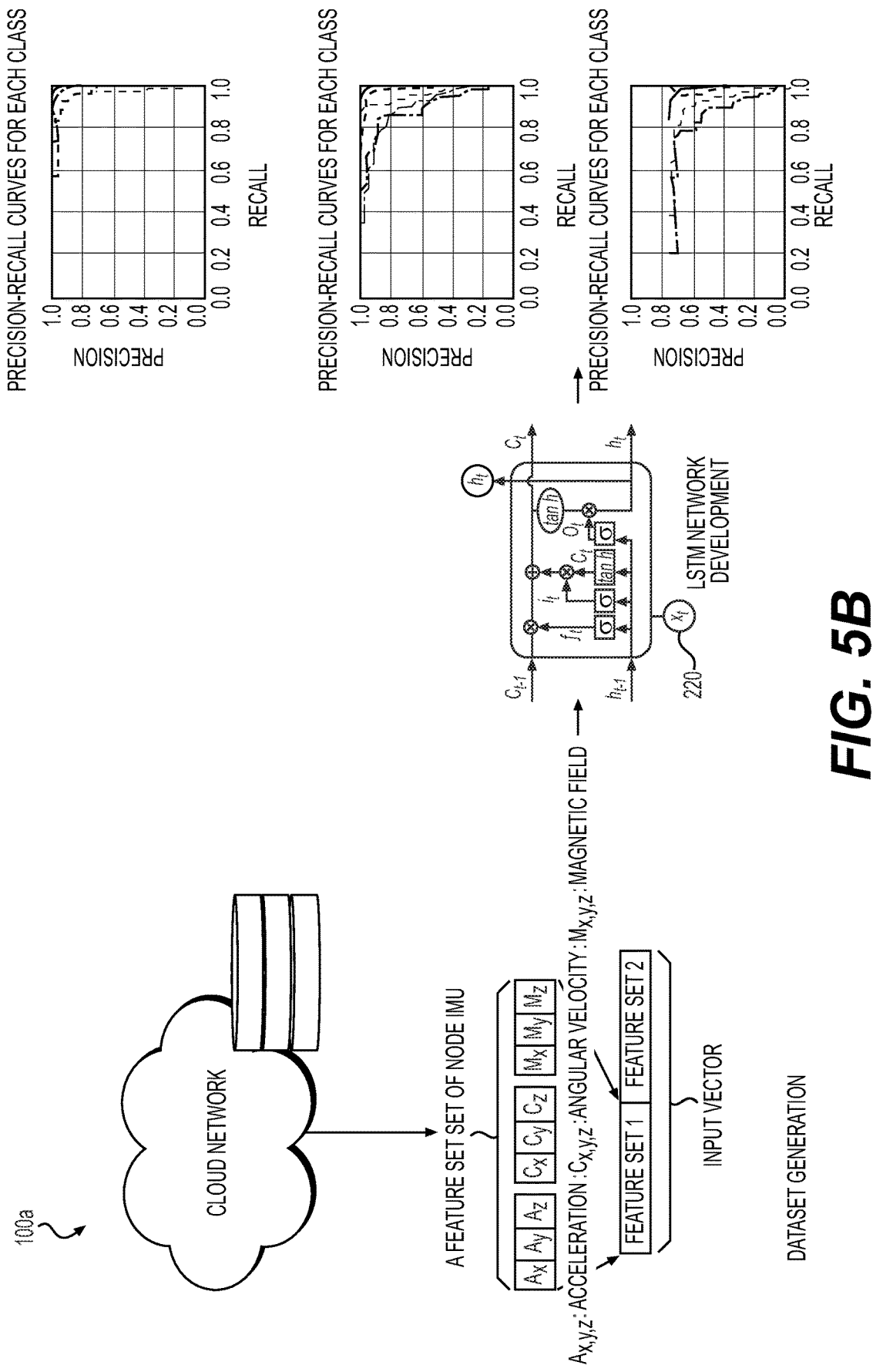

FIGS. 5A and 5B shows an example tracking system 100 (shown as 100a) in accordance with an illustrative embodiment. The tracking system 100a includes tracking devices 104 (shown as "PPU" 102d, 102e, and 102f). PPU tracking devices (102d, 102e, 102f), in some embodiments, uses a micro-controller unit (MCU) that is capable of communicating with each devices, other devices, and/or cloud server via Thread, Zigbee, and Bluetooth 5 communication protocols. In some embodiments, the PPU tracking devices (102d, 102e, 102f) device uses a nRF52840 MCU that operates with a 1-MB flash and 256 KB RAM. The device may be configured with an additional micro SD card for data storage. The devices embed IMU and GPS sensors. The Li-ion battery used to power the device can be charged with a regular cell-phone charger of USB micro b interface or USB Type-C interface. Table 2 provides example specification for a PPU tracking device (e.g., 102d, 102e, 102f).

TABLE 2

| Controller | MCU | nRF52840 |
|---|---|---|
| | RAM | 256 kB |
| | Storage | 1 MB Flash + Micro SD card |
| | Communication | Thread, Zigbee, Bluetooth 5 |
| Sensor | IMU | 9 axis output |
| | GPS | |
| Power | Battery type | Li-ion battery |
| | Interface | USB micro b/USB Type-C |

The PPU tracking devices (e.g., 102d, 102e, and 102f) may be used to facilitate the identification of the action or behavior of the worker who carries the device to measure worker's productivity and safety, e.g., using a Long Short-Term Memory (LSTM) network, e.g., as discussed in relation to FIG. 2. The LSTM network is a deep-learning algorithm designed to learn sequential information. Since a motion is the result of a series of movements, the LSTM network is useful to recognize the motions. This system utilizes three motion sensors embedded in the PPUs located on the wrist, neck, and hip. Inertial Measurement Units (IMUs) as the motion sensors measure acceleration, angular velocity, and magnetic field, which will be used as input data for training the network. While the existing motion recognition approaches focused on recognizing either arm-based or trunk-based motions (activities), this system has a capability of recognizing both arm-based and trunk-based motions while minimizing the required number of the sensors. The location, worker's behavior, and event information integrated with Building Information Model (BIM) or 2D (3D) CAD drawings in the database are visualized, in some embodiments, and provided for the remote site manager.

The controller has been designed to be minimized in size so that it can be readily embedded in safety vests or used as wristwatches. More sensors can be integrated to the system to improve accuracy of motion and action classification.

In some embodiments, the PPU tracking devices (e.g., 102d, 102e, and 102f) is configured for used in conjunction with a set of beacons (shown as 502) each configured with Zigbee or Bluetooth 5 communication device. In some embodiments, before the system deployment, initialization information of beacons (Bluetooth transmitter) is transmitted from the cloud server (shown as "Cloud server" 116) to the PPU tracking devices (e.g., 102d, 102e, and 102f). The information includes coordinates, sensor configuration, and sensor calibration data. Once the location of the devices carried by the individual worker is initialized, the location tracking process is conducted with the installed beacons and the device without the cloud-server. Based on the signal strength of each beacon, the location of the device is identified. For the personal protection unit (PPU), the distance calculated from the signal strength between PPU and the beacons is the criterion of the improper use. Whenever the predefined events such as hazardous zone access and improper use of PPU occur, the event records are transmitted to the cloud server via a Thread mesh network.

Figure 6A:
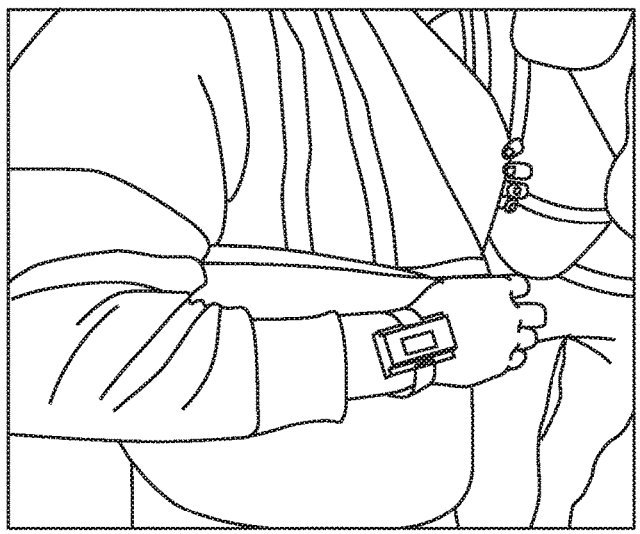
FIGS. 6A, 6B, 6C, and 6D show example implementations of portable personal tracking apparatus in accordance with an illustrative embodiment.
Figure 6B:
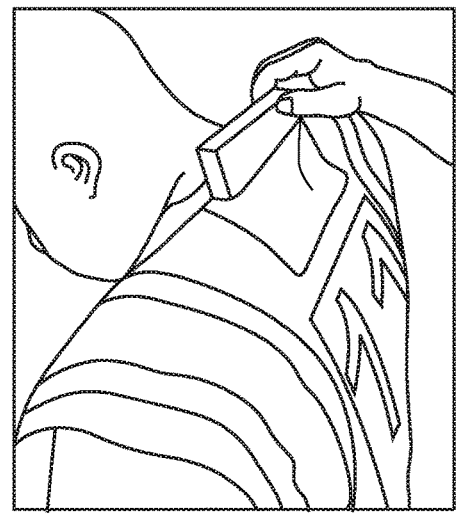
Figure 6C:
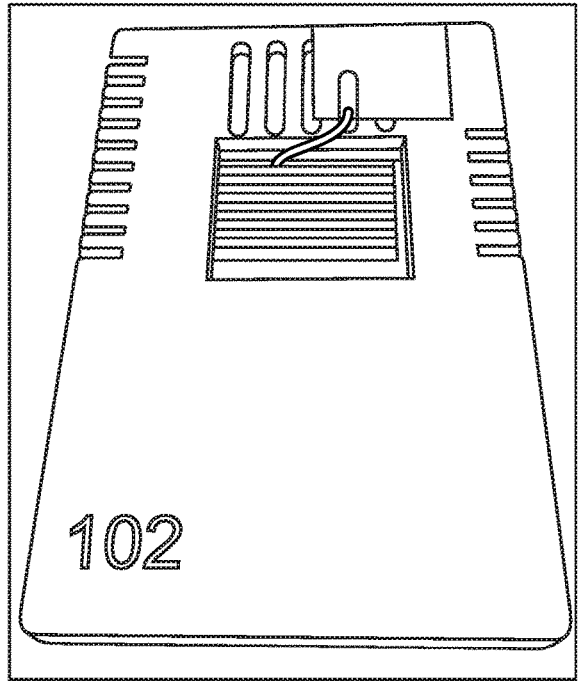
Figure 6D:
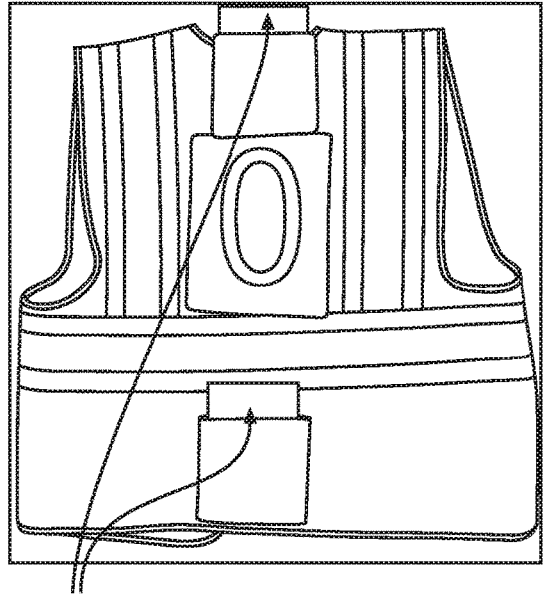

FIGS. 6A, 6B, 6C, and 6D show example implementations of portable personal tracking apparatus 102 in accordance with an illustrative embodiment. In FIG. 6A, the portable personal tracking apparatus 102 is configured with a housing having a wrist strap to be attachable to the wrist of a wearer. In FIG. 6B, the portable personal tracking apparatus 102 is configured to be inserted into garment or safety vest. FIG. 6C shows portable personal tracking apparatus 102 of FIG. 6B. FIG. 6D shows a safety vest configured to receive two portable personal tracking apparatuses 102 of FIG. 6B for monitoring of motion at two torso positions.

Example Proximity Based Safety Sensing System

Figure 5C:
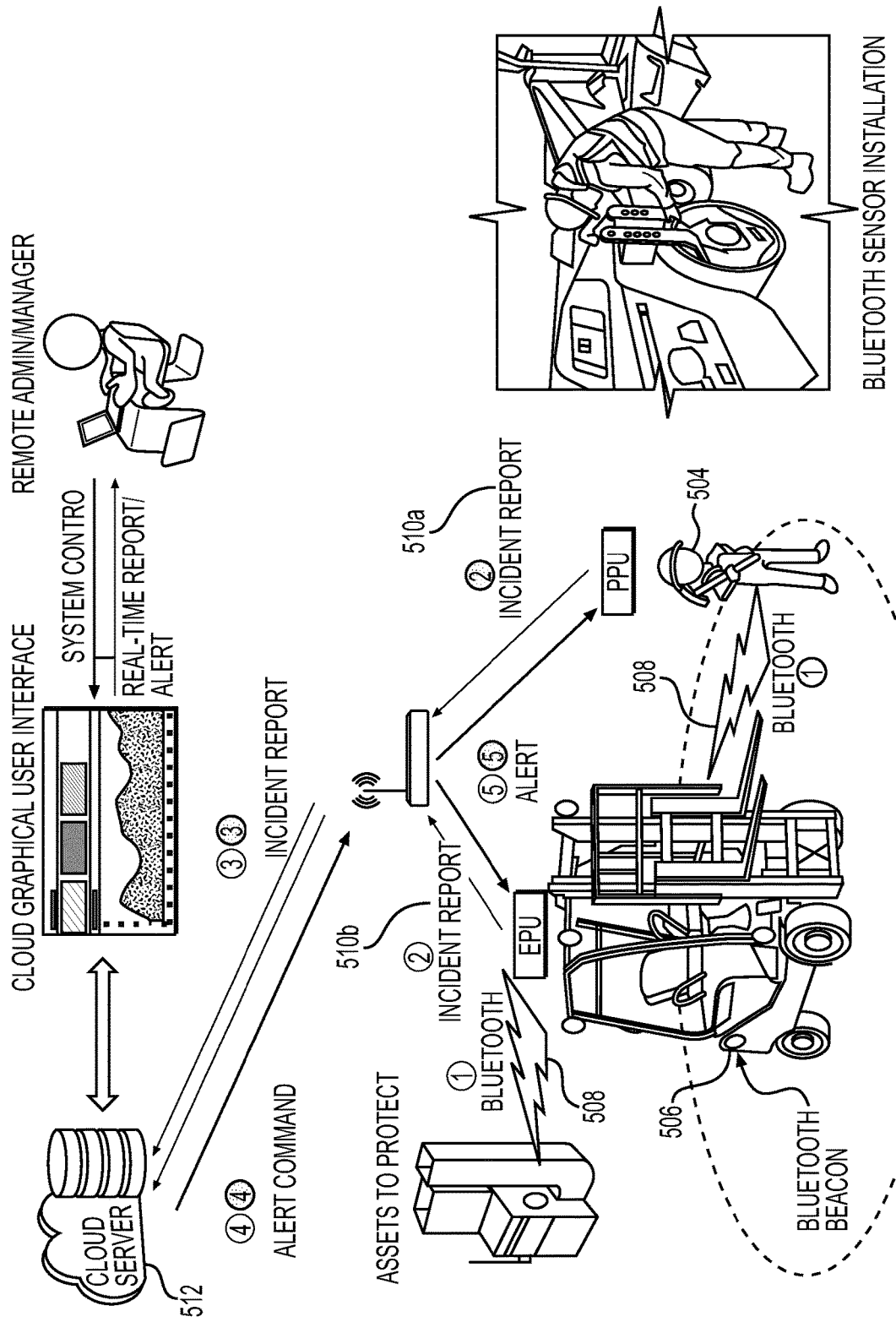
FIG. 5C shows a site proximity safety sensing system in accordance with an illustrative embodiment.

FIG. 5C shows a site proximity safety sensing system 500 in accordance with an illustrative embodiment. In some embodiments, the site proximity safety sensing system 500 is configured as a stand-alone system independent of the tracking system (e.g., 100, 100a). In other embodiments, the safety sensing system 500 is configured to operate in conjunction with the tracking system (e.g., 100, 100a).

Figure 6E:
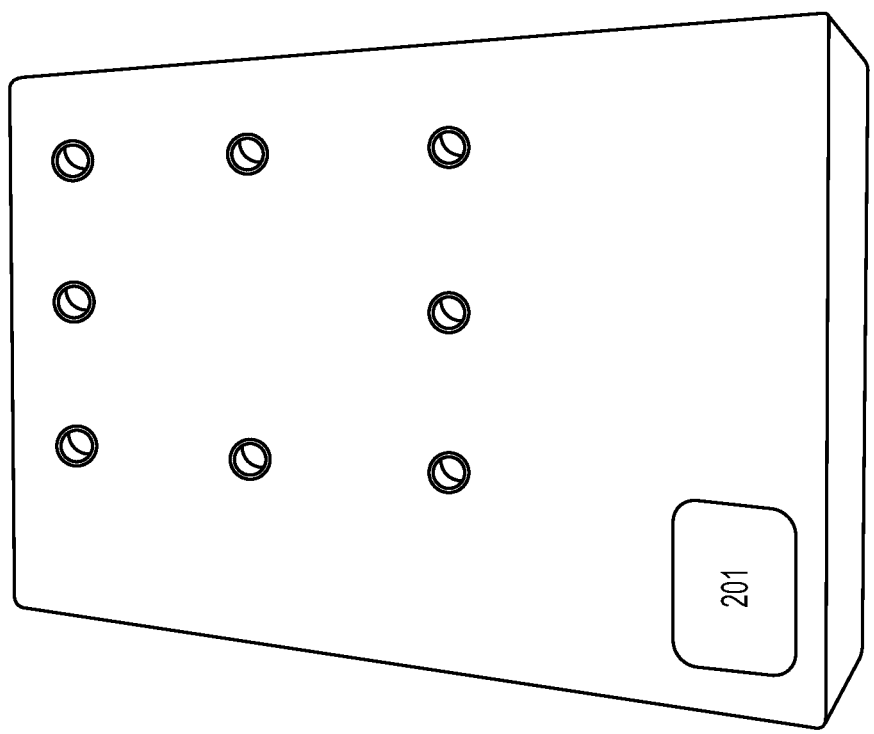
FIG. 6E shows an example implementation of an equipment protection unit in accordance with an illustrative embodiment.

The site proximity safety sensing system 500 includes a personal protection unit (PPU) 504 configured to generate an alert based on sensed proximity to hazardous areas defined by transmitted signals (shown as 508) from an equipment protection unit (EPU) (506) or a beacon device (e.g., 502). The transmitted signal (e.g., 508) may be based on Bluetooth, Tread, or other short-range low power communication protocol. The controller of the personal protection unit 504 generates an alarm to warn the worker and additionally transmit an alert signal to the nearby equipment protection unit 506, which is configured to generate an alert on the equipment protection unit 506 to potentially warn the equipment operator of the nearby worker. As shown in FIG. 5C, the EPU (e.g., 506) may similar generate an alert based on sensed proximity to hazardous areas defined by a beacon (e.g., 502) or an indication when in proximity to a PPU (e.g., 504). The PPU and EPU (e.g., 504, 506) may generate a proximity-triggered event (shown as "Incident report" 510a and 510b, respectively) to the remote server 116 (shown as "Cloud Server" 512). FIG. 6E shows an image of a prototype equipment protection unit (e.g., 506). The EPU prototype of FIG. 6E includes directional indicators that provide a direction of a proximity-triggered event.

The personal protection unit (PPU) 504 maybe embedded or attached to a workers' safety vest or wrist while the equipment protection unit (EPU) 506 is attached to an equipment located on-site or a heavy moving equipment. In some embodiments, the equipment protection unit 506 includes similar or same controller and networking device as the personal protection unit 504. In some embodiments, the personal protection unit 504 utilizes the same controller, networking device, and alert device as discussed in relation to the portable personal tracking apparatus 102. In other embodiments, the personal protection unit 504 implements a controller and networking device similar to those discussed in relation to the portable personal tracking apparatus 102 but additionally include an alert device such as i) a piezoelectric or motor to generate a vibration alert and/or ii) a speaker to generate an audio alert.

In some embodiments, each of the personal protection units 504 and equipment protection units 506 includes an ultra-low power multiprotocol System on Module (SOM) as the main controller. The controller is capable of communicating with other devices or a cloud server via Thread, Zigbee, and Bluetooth 5 communication protocols. Other controller and SoM configuration may be used.

The controller is configured, by computer-readable instructions, to sense the signal strength from the nearby beacons or from nearby EPUs attached to equipment to estimate the proximity to the equipment. The personal protection unit (PPU) 504, in some embodiments, is configured with sensor units such as IMU and GPS. The acquired data of the IMU sensors may be used to identify current behavior and motion of a worker, while the GPS data can provide the worker's location. The data may be transmitted to a remote server (e.g., cloud server) configured to monitor for safety. If a given device (e.g., 504 or 506) is out of the network and is not able to send the information to the remote server, the device (e.g., 504 or 506) may store the data in persistent memory (e.g., memory card) to subsequently transmit once the network connectivity with the remote server is re-established. The personal protection units 504 and equipment protection units 506 may include one or more Li-ion battery packs to power the device. In some embodiments, the battery packs may include connector of conventional smart-devices (e.g., cell-phones). The PPU and EPU may be designed to minimize power consumption to enhance the battery lifetime.

In some embodiments, the personal protection unit 504 is configured with a housing having a wrist strap (e.g., as a watch-type alert device). The watch personal protection unit 504 can be used in noisy and harsh environments such as construction sites for better alert notification. The personal protection unit 504 may also be configured to be embedded into or affixed onto safety vests for construction workers.

EPU (e.g., 506) is a device that is attached to an equipment. An EPU (e.g., 506) may have the same functionalities with a PPU, but with routing functionality that connects the internal mesh network and outer network, and an LED indicator that displays the direction of nearby workers. As shown in FIG. 5C, if a worker comes in a certain range to a construction equipment, the PPU (504) of the worker senses the triggered proximity alert and provide strong vibratory alerts so that the worker does not miss the alert. For outdoor environments, where WiFi infrastructure for wireless communication is not yet established such as construction sites, the Thread mesh network is adopted for the main communication channel with a WiFi/Thread gateway. Instead of paring a watch with a PPU, this device will work as one unit as the form of wristwatch.

Thread is a low-power mesh networking protocol. As a mesh network, there is no single point of failure. Additionally, the mesh network can be established using moveable transponders. The protocol provides communication range typically around about 100 m, which is suitable for construction sites where entities such as construction workers and equipment are scattered in a wide area. Every device in the Thread mesh network has either of two roles: end device and router. An end device sends and receives data through the network but does not relay data packets, whereas a router relays data packets so that end devices can communicate with other entities in the network. A border router is a router that can communicate with an external network.

Example PPU and EPU. In some embodiments, the personal protection unit 504 and the equipment protection unit 506 are each configured with an ARM-based small computing device with a short-range low-power communication module (e.g., Bluetooth and XBee), an Inertial Measurement Unit (IMU), a Global Positioning System (GPS), and appropriate software. Example specification for the PPU and EPU are provided Table 3.

TABLE 3

| Controller | MCU | nRF52840 (ARM Cortex-M4) |
| | RAM | 256 kB |
| | Storage | 1 MB flash + Micro SD card |
| | Communication | Thread, Zigbee, Bluetooth 5 |
| Sensor | IMU | 9 axis output |
| | GPS | |
| Display | Resolution | 128 × 64 |

TABLE 3-continued

| Power | Battery type | Li-ion battery |
| | Charge interface | USB micro b |

Another set of specification for the PPU and EPU are provided Table 4.

TABLE 4

| Controller | MCU | ARMv7-A |
| | RAM | 1 Gb |
| | Storage | Micro SD card |
| | Communication | Wifi, Zigbee, Bluetooth 5 |
| Sensor | IMU | 6 axis output |
| | GPS | |
| Display | Resolution | 128 × 64 |
| Power | Battery type | Li-ion battery |
| | Charge interface | USB micro b/USB Type-C |

Beacon. In some embodiments, the beacons (e.g., 502) are attached to the equipment and advertise a proximity sensing signals (e.g., low-power Bluetooth). The personal protection unit 504 receives the transmitted proximity sensing signal and estimates a distance from the beacon located on the equipment. If the distance to the equipment is below a predetermined reference distance, the personal protection unit 504 generates an alert indicating a hazard or potentially hazardous situation.

Figure 5D:
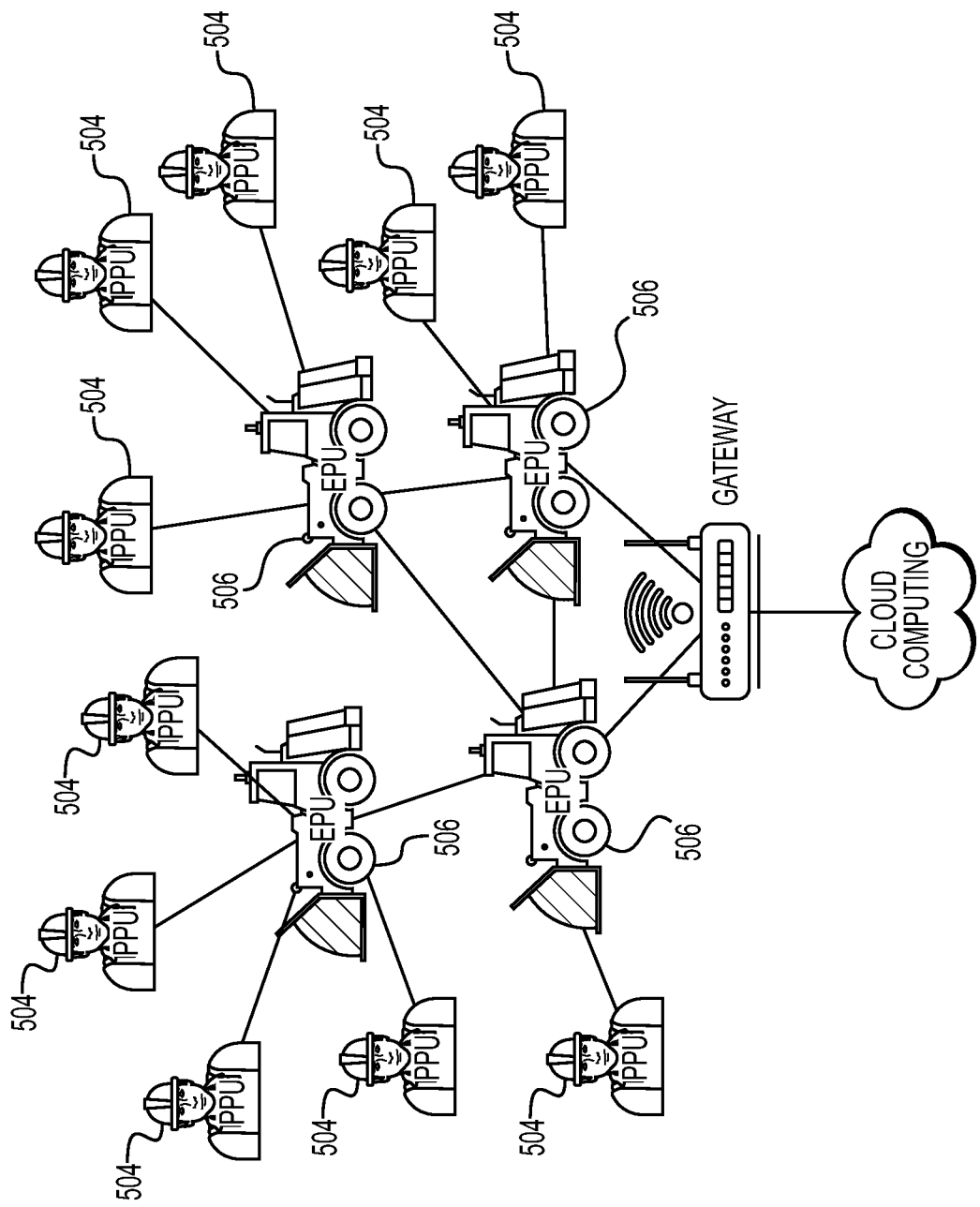
FIG. 5D shows an example mesh network communication system in accordance with an illustrative embodiment.

Tread Network Architecture. FIG. 5D shows an example mesh network communication system in accordance with an illustrative embodiment. In FIG. 5D, the proximity safety sensing system is configured so that the personal protection units 504 are each configured to operate as an end device and the EPUs 506 are each configured as a router device (e.g., for optimal battery life). The EPUs 506 configured to transmit data from the end points (e.g., 504) to the cloud infrastructure, or the like. Other network topology may be used.

In some embodiments, certain EPUs are equipped with a WiFi router or an LTE router to operate as border routers. In instances where no border router is located in the network, PPUs and EPUs have internal storage to accumulate the data to send. If there is no border router in the network, but EPUs exist, the information of the PPU is sent to EPUs. EPUs may accumulate the data and send it to the external server (e.g., 116) when a border router joins the network.

Figure 5E:
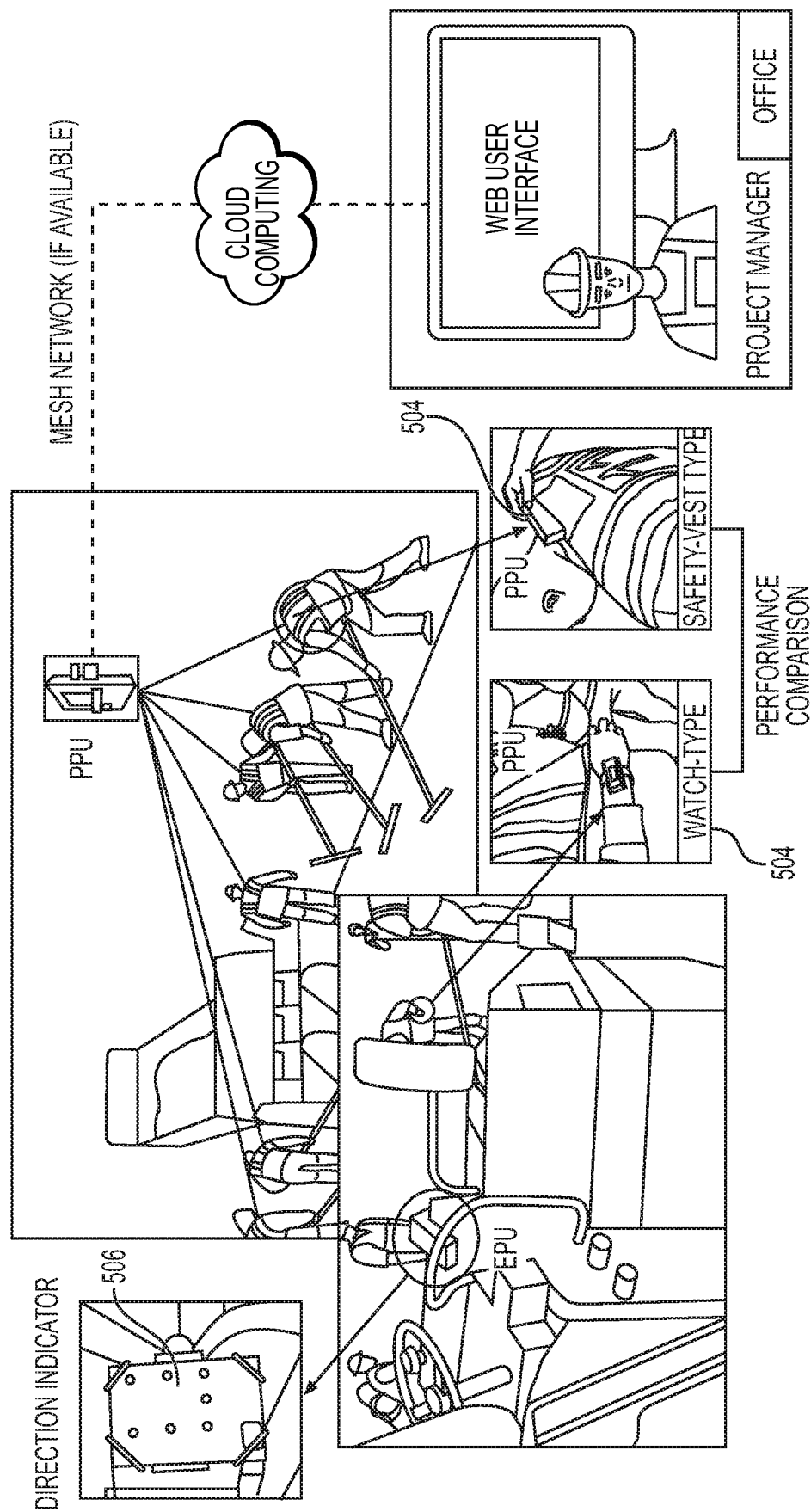
FIG. 5E shows an example deployment of PPU prototypes and EPU prototypes in a construction work zone in accordance with an illustrative embodiment.

FIG. 5E shows an example deployment of PPU prototypes (504) and EPU prototypes (506) in a construction work zone in accordance with an illustrative embodiment. The PPU prototype is configured with a PPU device 504 as described in Table 3. The EPU prototype is also configured with an EPU device 506 as described in Table 3.

Noise Filtering. To improve measurement of signal strength, which can be highly noisy as it can be sensitive to external noises, a noise filtering process is implemented, in some embodiments, to improve the accuracy of measurements of the distance to beacons. In a proximity safety sensing system (e.g., 500), PPUs is configured to filter out noises using filtering algorithms such as the extended Kalman filter or a particle filter. It has been observed a particle filter showed a better performance in terms of accuracy and delay but required more power consumption.

To enhance the performance of the noise filtering process, PPUs are configured, in some embodiments, to send unfiltered raw measurements with the filtered signals to the server. The server (e.g., 116, 502) is configured to collect the raw measurements to calibrate the parameters of the filtering algorithms and beacons' locations and signal characteristics. The calibration data is sent back to PPUs and the calibration and update are performed seamlessly without affecting the operation.

In some embodiments, PPUs (e.g., 504) is configured to alert the carrying workers when they are in a specific range to nearby equipment. However, the distance measurement is still a noisy process even though noises are filtered out. PPUs may continue to emit alert if a worker is near the boundary of the given range to equipment, as the distance may show that he keeps coming into/going out of the alert range. To be robust to noise, a hysteresis may be implemented to the alert condition. To this end, if a worker gets close to an equipment, the worker is considered to be close to the equipment until the worker is a certain distance far away from the equipment.

To avoid false positives when a worker need to work near a particular equipment, in some embodiments, the PPUs (e.g., 504) is configured to may alert the workers once in a given time window. To this end, once the PPU triggers an alarm, it does not notify the worker for a certain specified period to reduce the frequency of alert and interruption However, if the worker is still in the close range to an equipment after a pre-defined period, the PPU may begin to alert again.

The proximity safety sensing system may support granular alert configurations, for example, based on workers and/or roles. In some embodiments, every worker in the system is categorized by the specific role or job, and the alert conditions and frequencies may be configured differently for the workers' roles or jobs. In some embodiments, the system may mute the alert of the worker's PPU remotely if the worker occasionally operates an equipment. A remote manager may control the system via the web interface. If the configuration changes, it is sent to the entities in the mesh network and broadcasted to all PPUs.

Web User Interface for Monitoring

Figure 5F:
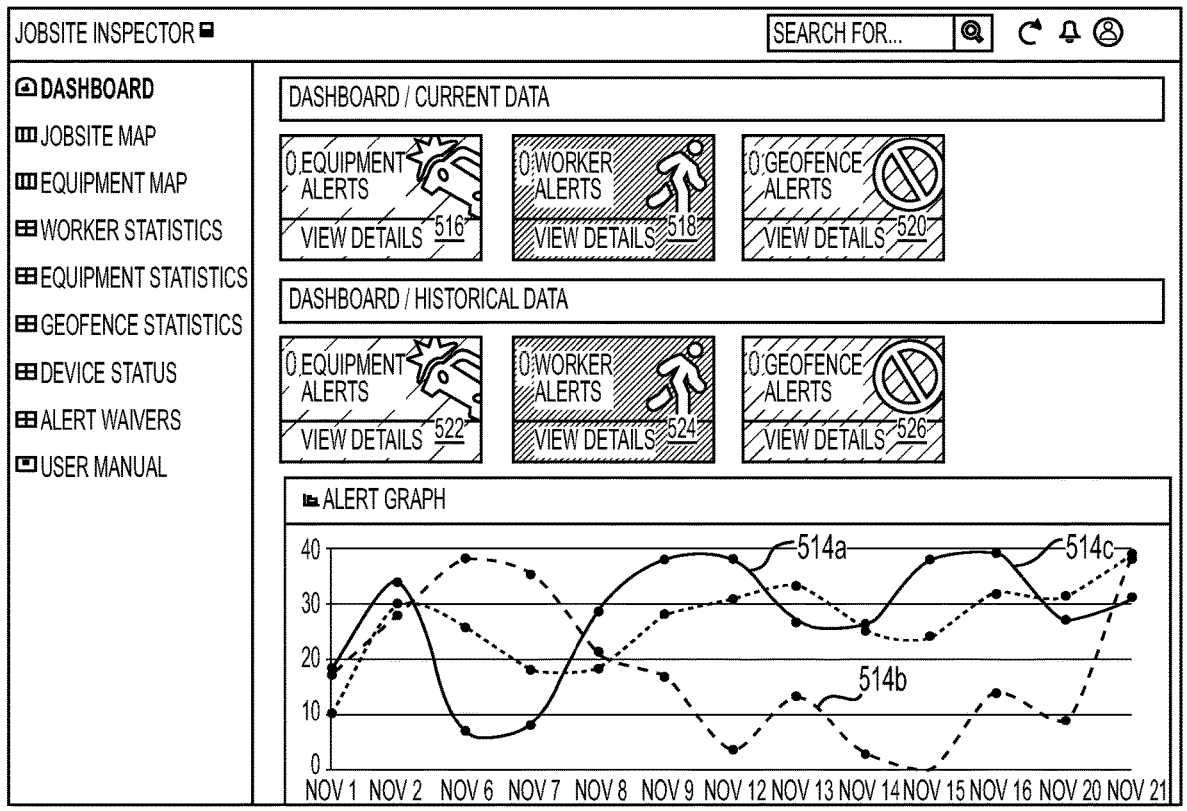
FIGS. 5F, 5G, and 5H show example graphical user interface for monitoring proximity safety alerts in accordance with an illustrative embodiment.
Figure 5G:
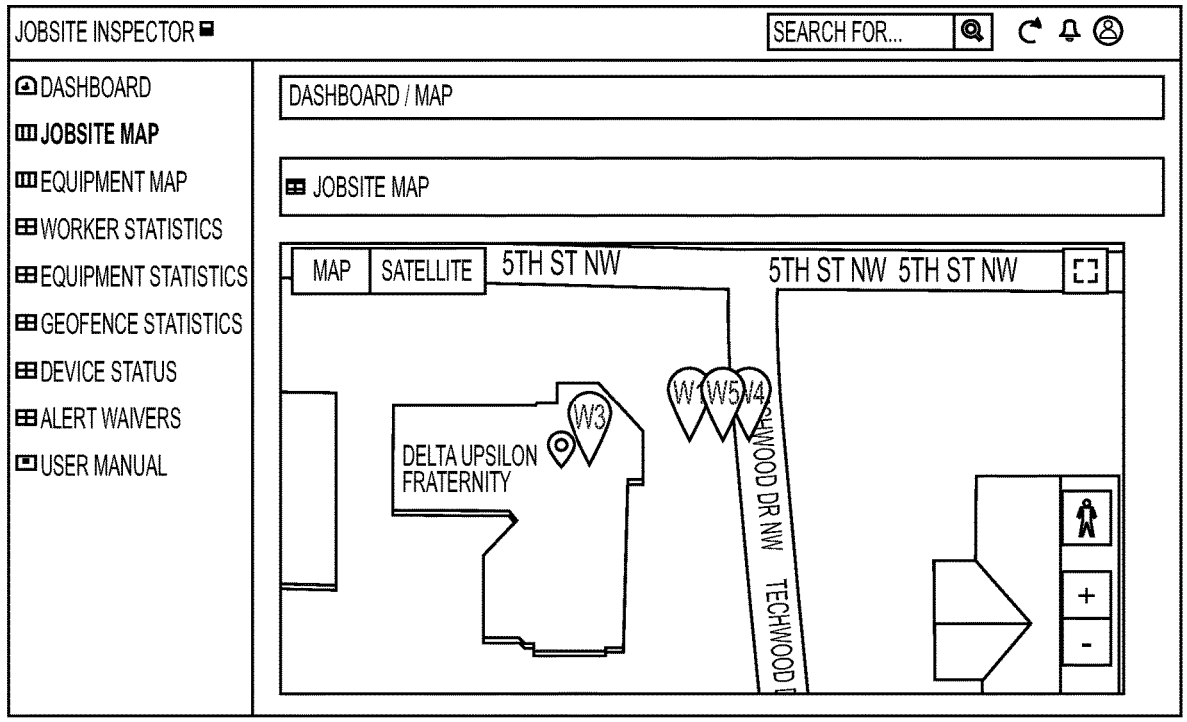
Figure 5H:
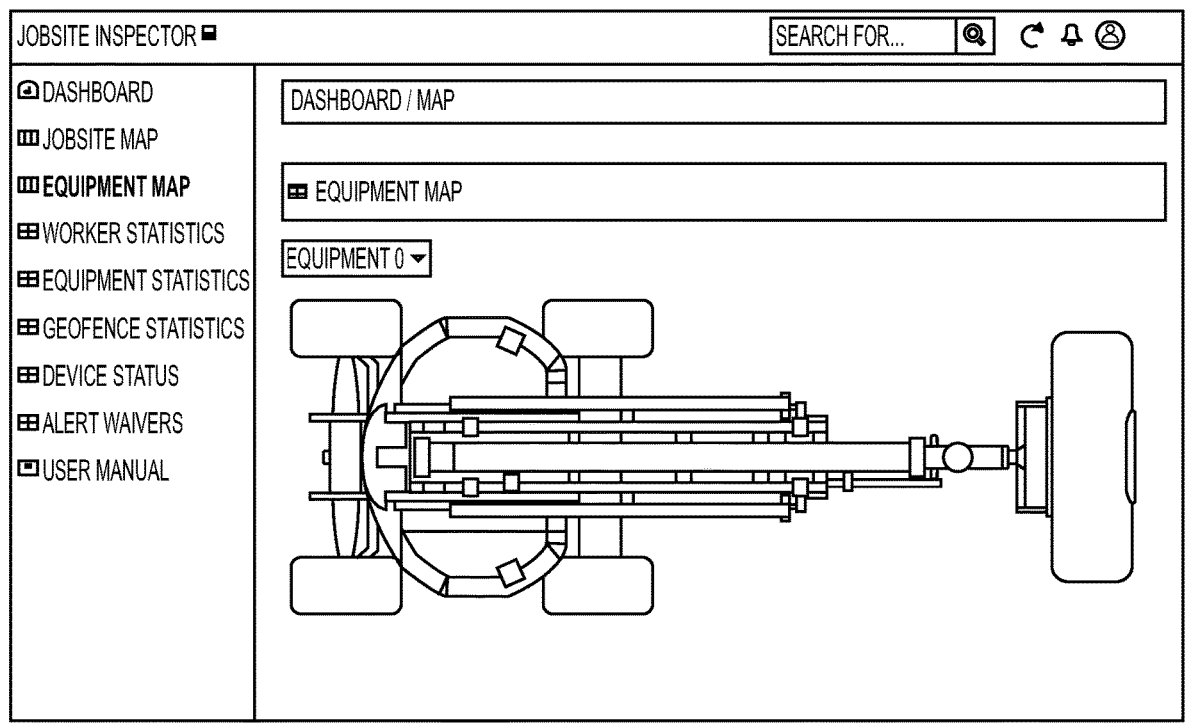

FIGS. 5F, 5G, and 5H show example graphical user interface for monitoring proximity safety alerts in accordance with an illustrative embodiment.

The remote servers (e.g. 116, 512), in some embodiments, control the PPU and EPU devices (e.g., 504, 506) to update the software of PPU and EPU devices remotely. The remote servers (e.g. 116, 512) also collects all the sensor data from the deployed devices (e.g., 504, 506). The data may be processed and converted to statistical data and can be monitored with a Web User Interface (UI). A construction site manager may connect to the UI with a web browser to monitor the current status and statistical data. The UI displays the current location and status of each worker. Beacons' locations, equipment information, worker information can also be configured with the UI.

FIG. 5F shows an example graphic user interface displaying statistical data of proximity sensor data for each monitored worker in accordance with an illustrative embodiment. FIG. 5G shows the example graphic user interface displaying GPS location data for each monitored worker in accordance with an illustrative embodiment.

In FIG. 5F, GUI displays data of the frequency that a given worker (shown as 514a, 514b, 514c) has triggered a proximity alert. The interface of FIG. 5F also shows the frequency of equipment, worker, or geofenced alerts for a given day or work shift (shown as 516. 518, and 520, respectively). The interface of FIG. 5F also shows the frequency of equipment, worker, or geofenced alerts for a given week or month (shown as "Historical Data" 522, 524, 526, respectively).

FIG. 5G shows the current location of each given worker at a given construction site. The UI can also show the prior locations of the workers during a specified time period (e.g., work shift, day, week, etc.)

FIG. 5H shows configuration of a given equipment, e.g., equipped with a beacon or EPU.

The work environment in the U.S construction industry has been shown to be a dangerous work environment. For one thing, the limited workspace in the job site may need to move with the progress of the work. The environment imposes greater issues to safety beyond the labor-intensive tasks. The environment also has potential for high level of interactions between pedestrian workers and dynamic construction equipment. For a decade, approximately a quarter of all construction fatalities were caused by visibility-related issues, a majority of which involve construction equipment and pedestrian workers. The proximity based alert system (e.g., 500) can help to prevent a safety accident at building or road construction sites by providing real-time and historical data of potential proximity events. The proximity based alert system may be deployed in any field using heavy equipment that safety is essential or a concern, including I factories, distribution centers, and warehouses.

The current safety regulations and standards mandated by the Occupational Safety and Health Administration (OSHA) require passive safety devices such as hard hats, reflective safety vests, and other personal protective equipment. These passive safety devices are incapable of alerting construction operators and workers in real-time during a hazardous proximity situation. Although there exist several proximity warning systems, including radar, sonar, RFID, GPS, magnetic marking fields, and cameras, they are not widely adopted by the construction industry for safety hazard protection. Several studies [45-48] found few adoptions of new technology for construction safety affected by poor accuracy, poor alert perception, size, weight, high cost, non-adjustable range, nuisance alerts, short battery life, and complicated calibration and installation processes.

Sonar and radar systems are not ideal options mainly due to their limited capabilities, such as short-range and high level of nuisance alarms. A great deal of metal interference was observed in the range reads of the radio frequency identification (RFID) technology [45]. Also, construction equipment and other ambient environmental conditions may influence the RFID system via multipath and other obstructions [49]. The magnetic field sensing technology has been used in underground mining and shows relatively good performance [47]. However, the downside of this device is that the installation and setup are difficult, the cost is relatively high, and it does not offer calibration ability but requires a change of expensive antenna to change the range limit, which adds more cost [47].

The proximity based alert system (e.g., 500) in configurations configured with Bluetooth Low Energy (BLE) technology may be deployed over a year with accurate measurement and without changing batteries. Unlike other existing technologies and products, the PPU (e.g., 504) can provide smart IoT functions with small and wearable devices with increased alert perceptions and decreased nuisance alerts which are common main weaknesses of the existing technologies.

To provide alerts to construction workers and equipment operators for a whole day, the hardware units, especially PPU, need to run without recharging batteries. From experimental results, it has been observed that the device of Table 3 can operate for more than a day.

Example Implementations and Results for Productivity Monitoring

Figure 7:
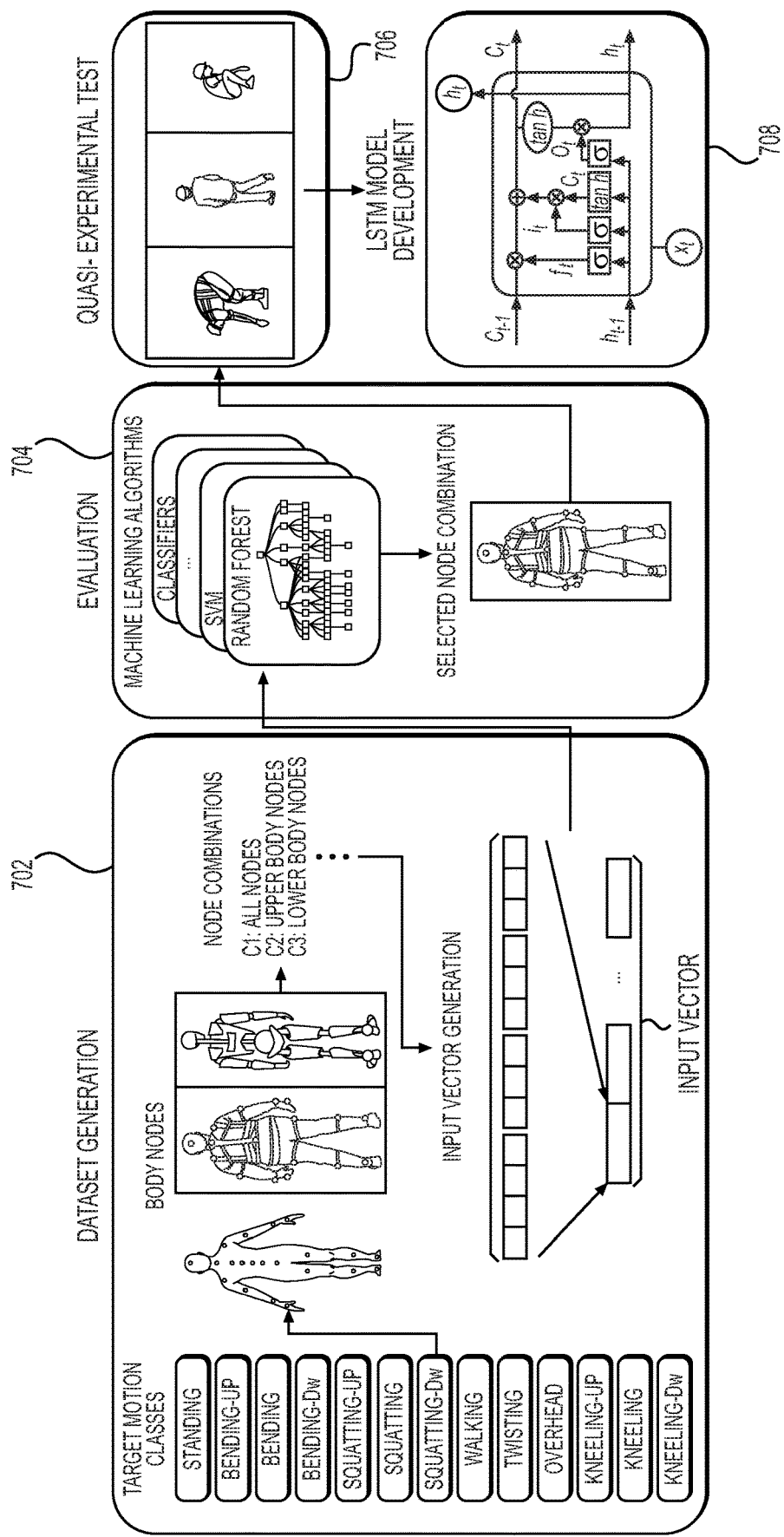
FIG. 7 is a diagram illustrating a framework of a study conducted to determine motion and action recognition effectiveness and performance on construction worker's motion and action in accordance with an illustrative embodiment.

Various aspects of the disclosed technology may be still more fully understood from the following description of example implementations and corresponding results and the images of FIGS. 7-9. Some experimental data are presented herein for purposes of illustration and should not be construed as limiting the scope of the disclosed technology in any way or excluding any alternative or additional embodiments.

Evaluation of Effectiveness of Numbers and Locations of Motion Sensors

FIG. 7 is a diagram illustrating a framework of a study conducted to determine motion and action recognition effectiveness and performance on construction worker's motion and action in accordance with an illustrative embodiment. As shown in FIG. 7, the study included three phases: the data set generation phase 702, an evaluation phase 704, and a quasi-experimental test phase 706. In the dataset generation phase 702, the study developed the data structure and action definitions for the data acquisition and testing methodologies to evaluate the effective numbers of sensors and locations to properly classify construction worker's motion and actions. During the evaluation phase 704, the acquired data are evaluated for a set of machine learning algorithms. The quasi-experimental test phase 706 was performed to validate the findings. LSTM based models were developed subsequently (shown as 708) and evaluated to improve action and motion recognition accuracy.

Target motion classes. In the instant study, as part of the data set generation phase 702, several observable motions typical of construction tasks (e.g., material handling tasks) were defined as evaluated as target motion classes, including standing, bending, squatting, walking, twisting, working overhead, kneeling, and using stairs. Further, certain motions, namely, bending, squatting, and kneeling, are defined based on a combination of other motions, e.g., to help in the reduction of loss of information caused by the transition of motions. For example, bending-up and bending-down are transitioning motions from the bending motion to other motions and vice versa, respectively. To this end, each of bending, squatting, and kneeling motions are considered as a combination of bending-up, bending, and bending-down motions. The instant study had 14 motions in total; 9 motions and 3 motions that are characterized by 3 motions each.

Body node definition. The instant study, as part of the data set generation phase 702, used a body-node definition set comprising twenty-one body joints or body parts empirically considered to be involved with construction tasks. FIG. 8A shows a diagram of the 21 body joints and body parts that comprised the construction-tasks body node definition in accordance with an illustrative embodiment. Specifically, FIG. 8A shows 21 joints and parts including the neck, head, left shoulder, right shoulder, left forearm, right forearm, left arm, right arm, hip, left hand, right hand, left thigh, right thigh, left leg, right leg, left foot, right foot, and four positions along the spine.

Node combinations. In the instant study, as part of the data set generation phase 702, node combinations were generated based on the acquired nodes of FIG. 8B for a different number of positions and locations. In addition, different combinations based on different number of sensors and locations were created to evaluate impacts the numbers and locations on the assessment of the datasets. The instant study investigated 32 implementations of machine learning algorithms with 32 node combinations to investigate the performance of motion recognition for evaluating the effectiveness of different numbers and locations of motion sensors on the recognition performance. Table 5 shows node combinations used in the instant study.

TABLE 5

| Combination | Selected nodes (the number of nodes) |
|---|---|
| 1 | All nodes (21) |
| 2 | Upper body (15) |
| 3 | Lower body (7) |
| 4 | Core nodes* (7) |
| 5 | Hip and head (2) |
| 6 | Hip and neck (2) |
| 7 | Hip and spine (5) |
| 8 | Head and neck (2) |
| 9 | Head and spine (5) |
| 10 | Neck and spine (5) |
| 11 | Hip (1) |
| 12 | Head (1) |
| 13 | Neck (1) |
| 14 | Spine (4) |
| 15 | Right thigh (1) |
| 16 | Right leg (1) |
| 17 | Right foot (1) |
| 18 | Left thigh (1) |
| 19 | Left leg (1) |
| 20 | Left foot (1) |
| 21 | Right shoulder (1) |
| 22 | Right arm (1) |
| 23 | Right forearm (1) |
| 24 | Right hand (1) |
| 25 | Left shoulder (1) |
| 26 | Left arm (1) |
| 27 | Left forearm (1) |
| 28 | Left hand (1) |
| 29 | Spine 3 - close to neck (1) |
| 30 | Spine 2 (1) |
| 31 | Spine 1 (1) |
| 32 | Spine 0 - close to hip (1) |

FIG. 8B shows a person configured with a wearable sensor at each of the joints and parts of FIG. 8A (except for the spine where the four nodes located on the spine were generated by interpolating of data collected at the neck and the hip nodes) in accordance with an illustrative embodiment. In FIG. 8B, wearable sensors (17 sensors) comprising distinct inertial measurement units (IMUs) was used to collect the motion sensor data for each of the nodes. The acquired sensor data were used to generate a segmented motion model of a person shown in FIG. 8C.

Figure 8D:
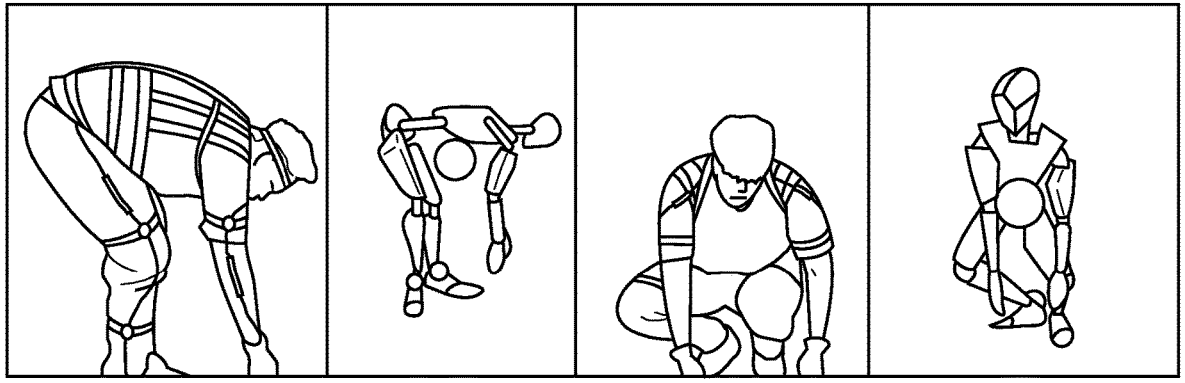
FIG. 8D shows examples tasks of the target motions that were performed during the construction worker's motion study in accordance with an illustrative embodiment.
Figure 8E:
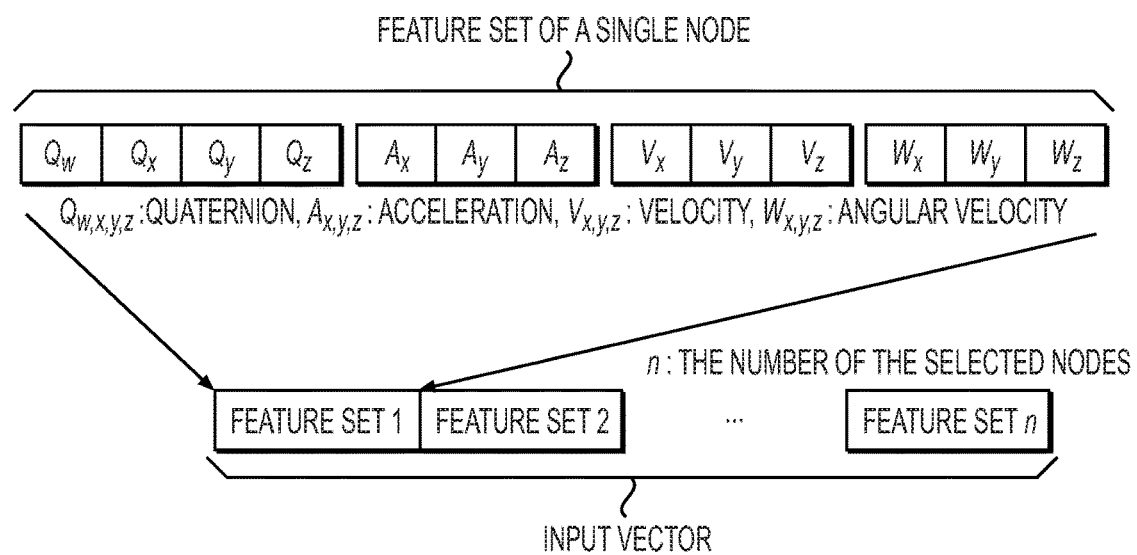
FIG. 8E shows the generation of the input vector for the machine learning operation from the acquired data and node definition in accordance with an illustrative embodiment.

Input vector formation. FIG. 8E shows the generation of the input vector for the machine learning operation from the acquired data and node definition in accordance with an illustrative embodiment. A separate input vector is defined for each node combination. Because the IMU for each node includes accelerometer, gyroscope, and magnetometer, each node includes a feature set comprising 13 values, namely, quaternion (4 values), acceleration (3 values), velocity (3 values), and angular velocity (3 values). As shown in FIG. 8E, the feature sets from multiple nodes in each node combination are concatenated to form an input vector for the node combination. Indeed, the length of the input vectors varied depending on the number of nodes in the node combinations. The generated input vectors were used as training and testing data for machine learning classifiers. Each data contained a discrete and time-independent motion state.

Machine learning algorithm implementation and data acquisition. The instant study, as part of evaluation phase 704, evaluated five machine learning algorithms-logistic regression, k-nearest neighbor, multilayer perceptron, random forest, and support vector machine—using the generated 32 different node combinations. The algorithms are each a supervised machine learning classification algorithm that categorizes data from the prior information, i.e., the labeled data [37]. Different types of machine learning classification algorithms that have been widely utilized for motion and activity recognition [21, 24, 28, 29] are deployed to investigate common findings regardless of the types of the classification algorithms utilized.

In the instant study, a single implementation of the five machine learning classifiers using the dataset from the particular node combination was repeated 32 times to simulate all cases, i.e., node combinations. The instant study performed 10-folds cross-validation in each implementation to find hyper-parameters of the classifiers and evaluate the classifiers. 10-folds cross-validation is a model validation technique in which the training data is randomly divided into 10 equal parts (folds). Each fold was used as the testing dataset, and remaining folds were used as the training dataset. The 10-folds cross-validation provided for the selection of the best hyper-parameters to which classifiers can be evaluated as generalized classifiers that show the desired classification performance with unseen data.

For the data acquisition, a wearable set of 17 IMUs was used to collect the data from a subject performing the defined 14 target motions with a 28-lb concrete block (FIG. 4) in a laboratory environment simulating a construction site. During the data acquisition, the subject performed material handling tasks including lifting, carrying, and placing with random order of motions. FIG. 8D shows examples tasks of the target motions that were performed during the study. The subject's motions were simultaneously videotaped to be used as the ground truth for labeling the data. In total, 18,350 data points were collected. Each data point had 273 values in which each of 21 IMU on 21 nodes generated 13 values. To label the dataset, the authors matched timestamps of the dataset with the recorded videos manually.

A. Logistic regression. Logistic regression is a linear model that calculates the class membership probability for one of two categories in the data [38]. This model is fit by Maximum-likelihood estimation that estimates the coefficients of the model that minimize the error of the calculated probabilities to the one in the data. Logistic regression can handle nonlinearity because an activation function is used. In addition, the output of the logistic regression model is interpretable because it is calculated as a probability.

B. K-nearest neighbor. K-nearest neighbor is a non-parametric classification method based on the k number data point in the feature space [28,39]. This method assigns an unseen data to a class that has the largest number of data among its k-nearest data point. Euclidean distance in the feature space is the metric to determine the distance between the data points. Hence, the k-nearest neighbor method does not require a training process. Also, this method has only one hyper-parameter, i.e., k (the number of data points to be considered). It enables easy implementation of the method.

C. Multilayer perceptron. Multilayer perceptron is a neural network classification model that describes the problems in a network of directed graphs, whose nodes are represented as artificial neurons and the weighted directed edges in the graphs are connections between the neurons [39]. The weights and bias of the network are computed by the backpropagation technique that iteratively updates the weights and bias based on the error rate obtained in the previous iteration. By using a non-linear activation function, multilayer perceptron model can be applied to complicated problems. Moreover, this method is robust to irrelevant input and noise [37].

D. Random forest. Random forest is an ensemble method for classification that consists of a combination of decision trees [24,40]. The classification performance of a single decision tree classifier is improved by integrating the bootstrap aggregating (bagging) method and randomization in the selection [40]. This method is fast, scalable, and robust to noise [37]. Support vector machine classifier is a model that classifies data based on the selection of the hyperplane that maximizes the margin between the hyperplane and data points [11].

E. Support vector machine. While the support vector machine is a linear classifier, non-linearity can be handled by using kernels that project the data from the original feature space to a high dimensional space using non-linear kernel function.

Results: Among the five evaluated classifiers, the random forest classifier showed the best classification performance in most cases. FIG. 9A shows the overall accuracy of the five evaluated machine learning classifiers in accordance with an illustrative embodiment. FIG. 9B shows the accuracy of the random forest classifier for all motion defined node combinations in accordance with an illustrative embodiment. The data suggests that independent measurements at two nodes at different and spaced out locations on the torso can facilitate the accurate classification of most movement in similar performance as with the use of all 21 sensors.

Quasi-experimental test. The findings of the evaluation were validated through the quasi-experimental test as part of the quasi-experimental test phase 706. The quasi-experimental test was conducted with three subjects in the environment similar to a construction site. The sensors were mounted at the hip and neck (node combination 6). To collect the data from the subjects, data collection devices developed by Robotics and Intelligent Construction Automation Laboratory (RICAL) group at Georgia Institute of Technology were utilized. The devices (e.g., 102) were carried by the subjects wearing the safety vests with two pockets on the neck and hip similar to that as shown on FIG. 6D. The devices (e.g., 102) have a wireless communication module for Wi-Fi and Bluetooth communications, a processing unit, and IMU so that they can automatically upload and store the IMU data to a cloud server. The three subjects were asked to perform material handling tasks including lifting, carrying, and placing with a 28-lb concrete block same as the task performed in the evaluation (704).

A dataset containing 32,396 data points was collected from the subjects. The data from two devices were concatenated to form input vectors and normalized to have a unit norm. Thus, each data point has 18 values from 9 values (3-axis acceleration, 3-axis gyroscope, and 3-axis magnetic field) acquired for the two devices. The dataset was shuffled and split into training data and testing data that occupy 60% and 40% of the entire dataset, respectively. The random forest classifier (having showed the highest accuracy in the evaluation phase) was implemented using the Scikit-learn library. To find the hyper-parameters, 10-folds cross-validation was utilized.

LSTM Model for Recognition of Construction Workers' Motion. Following the evaluation of machine learning algorithms, the instant study implemented, in 708, a LSTM-based motion recognition model. The LSTM motion recognition model was developed using Tensorflow, an artificial intelligence library using data flow graphs to build models. A computer equipped with Intel® Core™ i7-8650U CPU, Intel® UHD Graphics 620, and 16 GB RAM was used to implement the model. The model utilized the same dataset collected from the quasi-experimental test. After two data from two data collection devices were concatenated and normalized, 40 input vectors were segmented into a sequence as an input of the LSTM model. Since the 30 data points were collected in each second, one sequence contains the data collected every 1.3 s. The overlap ratio of the grouping was 95%, which means 95% of the data are shared between adjacent sequences. As a result of the sequence segmentation, 16,178 data points (i.e., 16,178 sequences) were obtained. The shape of the generated sequential dataset was 16,178 by 18 by 40. Once the dataset was modified in the format of the sequential data, the dataset was shuffled and split into training data and test data that occupy 70% and 30% of the total dataset, respectively.

The training data was split again into training data and validation data; the training data was used in the actual learning process and the validation data was used in the fine-tuning process. The test data was used to evaluate the performance of the model. he tuned hyper-parameters of the model are as shown in Table 1. The parameters were tuned by adjusting the values while observing the optimization loss and accuracy of the train and validation sets. As a result, the losses and accuracy over iterations with the tuned hyper-parameters were recorded as shown in FIGS. 3A and 3B. The losses over iteration graphs showed that the losses were converged enough after 350 epochs, and the difference between train loss and validation loss was small enough, which means the model was well-trained without overfitting.

The developed LSTM model showed an accuracy of 94.73% on the test set. FIG. 4B and FIG. 4C show the confusion matrixes of the result without normalization and with normalization, respectively. Kneeling-up and kneeling-down motion were omitted from the result because these motions were taken during a very short time that was less than 0.3 seconds. Since the label of the sequences was determined as the dominant label in the sequence, those two motions were omitted even if they were in the sequences Discussion In the instant study, 13 motions were successfully recognized using the LSTM model with an accuracy of 94.73%. Compared to the best-performed accuracy of 82.39% among the five conventional machine learning algorithms, the developed LSTM network showed significantly higher accuracy.

It was observed that the developed model outperformed the existing motion and activity recognition methods in terms of accuracy, the number of classes, and the number of sensors as shown in table in FIG. 4D. For example, compared to the convolutional LSTM [31], the developed LSTM model showed higher accuracy with fewer number of sensors and a greater number of target classes. The results suggest that the developed model learned sequential patterns of the motions from the raw sensor data better than the one in which convolutional layers were adopted to the raw data.

The results of the quasi-experimental test showed inherent motion distributions of the material handling tasks. For example, among 4853 sequential data points in the testing data, 2885 points were classified as 'Walking' motions. This result suggests that the subjects spent more than 50% of their working time on carrying material or moving their position for the next material. Similarly, 932 points were classified as 'Standing' motions which mean the subjects were idling during about 20% of their working time. This distribution is naturally observed because carrying material is the most time-consuming activity in the material handling tasks while lifting or placing a material takes less time than carrying. Therefore, with the motion distributions of workers, their behavior can be individually monitored and analyzed.

The developed LSTM model recognized the major motions with very high accuracy. For example, the areas under PR curves of standing, walking, working overhead, and kneeling were over 0.99. The results suggest that most instances in these motions were correctly classified. While transitioning motions such as bending-down and squatting-down motions showed smaller areas under PR curves than the other motions, likely because transitioning motions are motions defined between the major motions and has distinguishable patterns. Nevertheless, the use of the transitioning motions benefits the classification to major motions. Considering the applications of motion recognition models in construction projects, the major motions are the motions of interest for safety and productivity measurements. Therefore, the use of the transitioning motions can improve the practicality of the developed motion recognition model.

The LSTM model was implemented using lower-performance computer because the size of the input data used in this study was much smaller than the one used in other on-going efforts. With a dataset of 16,178×18×40 matrix with float numbers, the LSTM model was implemented without a high-performance computer.

While the present disclosure has been described with respect to specific embodiments, many modifications, variations, alterations, substitutions, and equivalents will be apparent to those skilled in the art. The present disclosure is not to be limited in scope by the specific embodiment described herein. Indeed, various modifications of the present invention, in addition to those described herein, will be apparent to those of skill in the art from the foregoing description and accompanying drawings. Accordingly, the disclosure is to be considered as limited only by the spirit and scope of the disclosure (and claims), including all modifications and equivalents.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Unless clearly specified to the contrary, there is no requirement for any particular described or illustrated activity or element, any particular sequence or such activities, any particular size, speed, material, dimension or frequency, or any particularly interrelationship of such elements. Accordingly, the descriptions and drawings are to be regarded as illustrative in nature, and not as restrictive.

It should be appreciated that various sizes, dimensions, contours, rigidity, shapes, flexibility and materials of any of the components or portions of components in the various embodiments discussed throughout may be varied and utilized as desired or required.

It should be appreciated that while some dimensions are provided on the aforementioned figures, the device may constitute various sizes, dimensions, contours, rigidity, shapes, flexibility and materials as it pertains to the components or portions of components of the device, and therefore may be varied and utilized as desired or required.

Although example embodiments of the present disclosure are explained in detail herein, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

In summary, while the present invention has been described with respect to specific embodiments, many modifications, variations, alterations, substitutions, and equivalents will be apparent to those skilled in the art. The present invention is not to be limited in scope by the specific embodiment described herein. Indeed, various modifications of the present invention, in addition to those described herein, will be apparent to those of skill in the art from the foregoing description and accompanying drawings. Accordingly, the invention is to be considered as limited only by the spirit and scope of the disclosure, including all modifications and equivalents.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Unless clearly specified to the contrary, there is no requirement for any particular described or illustrated activity or element, any particular sequence or such activities, any particular size, speed, material, dimension or frequency, or any particularly interrelationship of such elements. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all sub ranges therein. Any information in any material (e.g., a United States/foreign patent, United States/foreign patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

The following patents, applications and publications as listed below and throughout this document are hereby incorporated by reference in their entirety herein.

LIST OF REFERENCES

[1] CPWR—The Center for Construction Research and Training, The Construction Chart Book: The U.S. Construction Industry and Its Workers, 6th ed., 2018. (Jul. 17, 2019).

[2] The National Institute for Occupational Safety and Health (NIOSH) Ergonomics and Musculoskeletal Disorders, Workplace Safety & Health (Jul. 18, 2019)

[3] Mckinsey & Company, The Construction Productivity Imperative, Mckinsey & Company, 2015 (Jan. 22, 2018).

[4] P. R. Ghate, A. B. More, P. R. Minde, "Importance of measurement of labour productivity in construction" (July 2019).

[5] McKinsey Global Institute "Reinventing construction: a route to higher productivity" (February 2020).

[6] L. Sveikauskas, S. Rowe, J. Mildenberger, J. Price, A. Young, "Measuring productivity growth in construction," Monthly Labor Review (2018).

[7] L. Pei, R. Guinness, J. Kaistinen, "Cognitive phone for sensing human behavior," IGI Global, Hershey, PA, USA, 2015, pp. 1138-1150.

[8] S. Han, S. M. Asce, S. Lee, A. M. Asce, F. Peña-Mora, M. Asce, "Vision-based detection of unsafe actions of a construction worker: case study of ladder climbing," J. Comput. Civ. Eng. 27 (2013) 635-644.

[9] J. Yang, Z. Shi, Z. Wu, "Vision-based action recognition of construction workers using dense trajectories," Adv. Eng. Inform. 30 (2016) 327-336.

[10] L. Ding, W. Fang, H. Luo, P. E. D. Love, B. Zhong, X. Ouyang, "A deep hybrid learning model to detect unsafe behavior: integrating convolution neural networks and long short-term memory," Autom. Constr. 86 (2018) 118-124.

[11] K. Kim, H. Kim, H. Kim, "Image-based construction hazard avoidance system using augmented reality in wearable device," Autom. Constr. 83 (2017) 390-403.

[12] H. Guo, Y. Yu, Q. Ding, M. Skitmore, "Image-and-skeleton-based parameterized approach to real-time identification of construction workers' unsafe behaviors," J. Constr. Eng. Manag. 144 (2018).

[13] H. Zhang, X. Yan, H. Li, "Ergonomic posture recognition using 3D view-invariant features from single ordinary camera," Autom. Constr. 94 (2018) 1-10.

[14] J. A. Hess, L. Kincl, T. Amasay, P. Wolfe, "Ergonomic evaluation of masons laying concrete masonry units and autoclaved aerated concrete," Appl. Ergon. 41 (2010) 477-483.

[15] H. Luo, C. Xiong, W. Fang, P. E. D. Love, B. Zhang, X. Ouyang, "Convolutional neural networks: computer vision-based workforce activity assessment in construction," Autom. Constr. 94 (2018) 282-289.

[16] V. Escorcia, M. A. Dávila, M. Golparvar-Fard, J. C. Niebles, "Automated vision-based recognition of construction worker actions for building interior construction

[16] operations using RGBD cameras," Construction Research Congress 2012, American Society of Civil Engineers, Reston, V A, 2012, pp. 879-888.

[17] Y. Yu, H. Guo, Q. Ding, H. Li, M. Skitmore, "An experimental study of real-time identification of construction workers' unsafe behaviors," Autom. Constr. 82 (2017) 193-206.

[18] S. Han, S. Lee, "A vision-based motion capture and recognition framework for behavior-based safety management," Autom. Constr. 35 (2013) 131-141.

[19] A. Golabchi, S. Han, S. AbouRizk, "A simulation and visualization-based framework of labor efficiency and safety analysis for prevention through design and planning," Autom. Constr. 96 (2018) 310-323.

[20] J. Chen, J. Qiu, C. Ahn, "Construction worker's awkward posture recognition through supervised motion tensor decomposition," Autom. Constr. 77 (2017) 67-81.

[21] R. Akhavian, A. H. Behzadan, "Smartphone-based construction workers' activity recognition and classification," Autom. Constr. 71 (2016) 198-209.

[22] N. D. Nath, A. H. Behzadan, "Construction productivity and ergonomic assessment using mobile sensors and machine learning," Computing in Civil Engineering, 2017, American Society of Civil Engineers, Reston, V A, 2017, pp. 434-441.

[23] R. Akhavian, A. H. Behzadan, "Productivity analysis of construction worker activities using smartphone sensors," Proceedings of 16th International Conference on Computing in Civil and Building Engineering, 2016, pp. 1067-1074.

[24] M. F. Antwi-Afari, H. Li, J. Seo, A. Y. L. Wong, "Automated detection and classification of construction workers' loss of balance events using wearable insole pressure sensors," Autom. Constr. 96 (2018) 189-199.

[25] S. Xing, H. Tong, P. Ji, "Activity recognition with smartphone sensors," Tsinghua Sci. Technol. 19 (2014) 235-249.

[26] J. Ryu, J. Seo, M. Liu, S. Lee, C. T. Haas, "Action recognition using a wristband-type activity tracker: case study of masonry work," Construction Research Congress, 2016, 2016, pp. 790-799.

[27] K. Yang, C. R. Ahn, "Inferring workplace safety hazards from the spatial patterns of workers' wearable data," Adv. Eng. Inform. 41 (2019).

[28] J. Ryu, J. Seo, H. Jebelli, S. Lee, "Automated action recognition using an accelerometer-embedded wristband-type activity tracker," J. Constr. Eng. Manag. 145 (2019) 1-14.

[29] K. Yang, C. R. Ahn, M. C. Vuran, S. S. Aria, "Semi-supervised near-miss fall detection for ironworkers with a wearable inertial measurement unit," Autom. Constr. 68 (2016) 194-202.

[30] A. Alwasel, A. Sabet, M. Nahangi, C. T. Haas, E. Abdel-Rahman, "Identifying poses of safe and productive masons using machine learning," Autom. Constr. 84 (2017) 345-355.

[31] J. Zhao, E. Obonyo, "Convolutional long short-term memory model for recognizing postures from wearable sensor," CEUR Workshop Proceedings, 2019.

[32] E. Valero, A. Sivanathan, F. Bosché, M. Abdel-Wahab, "Analysis of construction trade worker body motions using a wearable and wireless motion sensor network," Autom. Constr. 83 (2017) 48-55

[33] K. Yang, C. R. Ahn, H. Kim, "Validating ambulatory gait assessment technique for hazard sensing in construction environments," Autom. Constr. 98 (2019) 302-309.

[34] H. Jebelli, C. R. Ahn, T. L. Stentz, "Fall risk analysis of construction workers using inertial measurement units: validating the usefulness of the postural stability metrics in construction," Saf. Sci. 84 (2016) 161-170.

[35] H. Jebelli, S. M. Asce, Changbum, R. Ahn, A. M. Asce, T. L. Stentz, "Comprehensive fall-risk assessment of construction workers using inertial measurement units: validation of the gait-stability metric to assess the fall risk of Iron workers," J. Comput. Civ. Eng. 30 (2015).

[36] X. Yan, H. Li, A. R. Li, H. Zhang, "Wearable IMU-based real-time motion warning system for construction workers' musculoskeletal disorders prevention," Autom. Constr. 74 (2017) 2-11.

[37] A. Singh, N. Thakur, A. Sharma, "A review of supervised machine learning algorithms," Proceedings of the 10th INDIACom, 2016 3rd International Conference on Computing for Sustainable Global Development, INDIACom 2016, 2016, pp. 1310-1315.

[38] S. Dreiseitl, L. Ohno-Machado, "Logistic regression and artificial neural network classification models: a methodology review," J. Biomed. Inform. 35 (2002) 352-359.

[39] S.-R. Ke, H. Thuc, Y.-J. Lee, J.-N. Hwang, J.-H. Yoo, K.-H. Choi, "A review on video-based human activity recognition," Computers 2 (2013) 88-131.

[40] F. Attal, S. Mohammed, M. Dedabrishvili, F. Chamroukhi, L. Oukhellou, Y. Amirat, "Physical human activity recognition using wearable sensors," Sensors 15 (2015) 31314-31338.

[41] F. Ordóñez, D. Roggen, "Deep convolutional and LSTM recurrent neural networks for multimodal wearable activity recognition," Sensors 16 (2016) 115.

[42] Y. Zhao, R. Yang, G. Chevalier, M. Gong, "Deep residual Bidir-LSTM for human activity recognition using wearable sensors," Math. Probl. Eng. 2018 (2018) 13.

[43] D. P. Kingma, J. Lei Ba, "ADAM: a method for stochastic optimization," The 3rd International Conference for Learning Representations, San Diego, 2015.

[44] K. Boyd, K. H. Eng, C. D. Page, "Area Under the Precision-recall Curve: Point Estimates and Confidence Intervals," Springer, Berlin, Heidelberg, 2013.

[45] Goodrum, P. M., McLaren, M. A., and Durfee, A. (2006). "The application of active radio frequency identification technology for tool tracking on construction job sites." Automation in Construction, 15 (3), 292-302.

[46] Lazaro, A., Girbau, D., and Salinas, D. (2009). "Radio Link Budgets for UHF RFID on Multipath Environments." IEEE Transactions on Antennas and Propagation, 57 (4), 1241-1251.

[47] Park, J., Marks, E., Cho, Y., and Suryanto, W. (2015b). "Performance Test of Wireless Technologies for Personnel and Equipment Proximity Sensing in Work Zones." ASCE Journal of Construction Engineering and Management.

[48] Ruff, T. (2007). Recommendations for evaluating and implementing proximity warning system on surface mining equipment.

[49] Marks, E. (2014). "Active Safety Leading Indicators for Human-Equipment Interaction on Construction Sites." Doctoral Dissertation, Georgia Institute of Technology.

What is claimed is:

1. A productivity and safety tracking system comprising:
a plurality of portable personal tracking apparatus attachable to a safety vest or garment, including a first portable personal tracking apparatus and a second portable personal tracking apparatus, wherein the first portable personal tracking apparatus is attachable to the safety vest or garment at a first torso location of the safety vest or garment, wherein the second portable personal tracking apparatus is attachable to the safety vest or garment at a second torso location of the safety vest or garment, and wherein each of the first and second portable personal tracking apparatus comprises:
a respective inertial measurement sensor unit configured to measure a measurand selected from the group consisting of acceleration, angular velocity, and magnetic field;
a respective radio transceiver;
a controller unit operatively coupled to the respective radio transceiver and respective inertial measurement sensor unit;
wherein the first portable personal tracking apparatus is configured, by computer readable instructions, to generate a first inertial measurement data set associated with motion of the first torso location, wherein the second portable personal tracking apparatus is configured, by computer readable instructions, to generate a second inertial measurement data set associated with motion of the second torso location, and wherein the first and second inertial measurement data sets are concatenated for each of a plurality of nodes to form a respective feature set, wherein feature sets for each of the plurality of nodes are concatenated to form an input vector for classifier training or classification; and
wherein the input vector is subsequently used, in a motion recognition classification operation, to identify a sequenced motion from a set of candidate sequenced motions of a person.

2. The productivity and safety tracking system of claim 1, wherein the motion recognition classification operation is performed by i) a first machine learning classification operation trained from first data sets associated with motion and movement of a set of persons to identify one or more movement instances and ii) a second machine learning classification operation trained from second data sets associated with motion and movement of a set of persons to identify the candidate sequenced motions using the identified one or more movement instances.

3. The productivity and safety tracking system of claim 2, wherein the first machine learning classification operation is selected from the group consisting of logistic regression, k-nearest neighbor, multilayer perceptron, random forest, and support vector machine.

4. The productivity and safety tracking system of claim 2, wherein the second machine learning classification operation is performed by an artificial recurrent neural network or a multi-stacked Long Short-Term Memory (LSTM) network model.

5. The productivity and safety tracking system of claim 2, wherein the second machine learning classification operation is performed by a model configured to learn sequential information having temporal relationships on a long-time scale.

6. The productivity and safety tracking system of claim 2, wherein the first and second data sets associated with motion and movement includes, at least, measured data associated with a person standing, bending-up, bending, bending-down, squatting-up, squatting, walking, twisting, working overhead, and kneeling.

7. The productivity and safety tracking system of claim 1, wherein the system further comprises a third portable personal tracking apparatus, wherein the third portable personal tracking apparatus is attachable to an extremity, wherein the third portable personal tracking apparatus is configured, by computer readable instructions, to generate a third inertial measurement data set associated with motion of the extremity, and wherein the first, second, and third inertial measurement data sets are subsequently used, in the motion recognition classification operation, to identify the sequenced motion from the set of candidate sequenced motions of a person.

8. The productivity and safety tracking system of claim 1, wherein the respective inertial measurement sensor unit of the first portable personal tracking apparatus includes, at least, a 3-axis gyroscope, a 3-axis accelerometer, and a 3-axis digital compass.

9. The productivity and safety tracking system of claim 1, wherein the controller unit of the first portable personal tracking apparatus and is operatively coupled to the respective radio transceiver to determine a signal strength value for a transmitted signal sent from a low-power short-range beacon,
the first portable personal tracking apparatus further comprising a low-power communication device to establish a plurality of links with one or more portable personal tracking apparatuses of other productivity and safety tracking system to form a mesh network,
wherein the controller unit of the first portable personal tracking apparatus is configured, by computer readable instructions, to transmit, at least, the first inertial measurement data set in a plurality of datagrams, through the mesh network, to a gateway networking device, and
wherein the gateway networking device is configured to transmit received proximity event data messages to one or more remote computing devices.

10. The productivity and safety tracking system of claim 1, wherein at least one of the remote computing devices comprises a cloud server, a remote server, or a local server, wherein the at least one remote computing device is configured to store transmitted proximity event data to be subsequently presented, through curation operation performed by the one or more remote computing devices or another computer device, at a monitoring application executing at a monitoring terminal.

11. The productivity and safety tracking system of claim 1, wherein at least one of the plurality of portable personal tracking apparatus is configured to generate an audible and/or vibratory alert based on sensed proximity to safety-associated beacon.

12. The productivity and safety tracking system of claim 1, wherein the plurality of portable personal tracking apparatus includes a personal or equipment protection apparatus comprising:
a radio transceiver;
an ultra-low power multi-protocol system-on-module (SOM) unit operatively coupled to the radio transceiver to determine a signal strength value for a transmitted signal sent from a low-power short-range beacon; and
one or more alert devices each operatively coupled to the ultra-low power multi-protocol system-on-module (SOM) unit, wherein the one or more alert devices is configured, by computer readable instructions, to generate warning sound, a warning visual output, or a vibrational output based on the determined signal strength value, wherein the determined signal strength value is indicative of the personal or equipment protection apparatus being within a predetermined proximity to the low-power short-range beacon.

13. A method of monitoring productivity and safety comprising:
- retrieving, through a network, at a monitoring computing device, two or more inertial measurement data sets having been acquired from a portable personal tracking apparatus attached to a safety vest or garment including at least a first inertial measurement data set and a second inertial measurement data set, wherein the two or more inertial measurement data sets includes inertial measurement data acquired at a first torso location of the safety vest or garment and inertial measurement data acquired at a second torso location of the safety vest or garment, and wherein the first and second inertial measurement data sets are concatenated for each of a plurality of nodes to form a respective feature set, wherein feature sets for each of the plurality of nodes are concatenated to form an input vector for classifier training or classification;
- classifying, at the monitoring computing device, sequenced motion of a person wearing the safety vest or garment using the retrieved two or more inertial measurement data sets, wherein the classified sequenced motion is selected from the group of a person standing, bending-up, bending, bending-down, squatting-up, squatting, walking, twisting, working overhead, and kneeling; and
- storing, at the monitoring computing device, the classified sequenced motion, wherein the classified sequenced motion is subsequently curated to at a monitoring application executing at a monitoring terminal for the monitoring of productivity or safety of the person.

14. The method of monitoring productivity and safety of claim 13 further comprising:
- presenting, at the monitoring terminal, via a web-based or local GUI interface, frequency or duration of a given sequenced motion for a given work shift, day, week, or month.

15. The method of monitoring productivity and safety of claim 14 further comprising:
- presenting, at the monitoring terminal, via the web-based or local GUI interface, task associated sequenced motions for the given work shift, day, week, or month, wherein task associated sequenced motions comprises two or more defined sequenced motions associated with a given productivity task.

16. The method of monitoring productivity and safety of claim 14 further comprising:
- presenting, at the monitoring terminal, via the web-based or local GUI interface, frequency or duration of a safety event associated with a sensed proximity to safety-associated beacon for the given work shift, day, week, or month.

17. The method of monitoring productivity and safety of claim 13 further comprising:
- acquiring, at the portable personal tracking apparatus, the one or more inertial measurement data sets, wherein the portable personal tracking apparatus an inertial measurement sensor unit that includes, at least, a 3-axis gyroscope, a 3-axis accelerometer, and a 3-axis digital compass.

18. The method of monitoring productivity and safety of claim 13 further comprising:
- transmitting, from the portable personal tracking apparatus, to the monitoring computing device, the one or more inertial measurement data sets through a mesh network, as the network, established across a plurality of portable personal tracking apparatuses.

19. The method of monitoring productivity and safety of claim 13 further comprising:
- generating, at the monitoring terminal, an alert for a sensed motion associated with a person lying down.

* * * * *